US011958616B2

(12) United States Patent
Jones et al.

(10) Patent No.: US 11,958,616 B2
(45) Date of Patent: Apr. 16, 2024

(54) AIR DISTRIBUTION NOZZLES, AIRCRAFT THAT INCLUDE AIR DISTRIBUTION NOZZLES, AND METHODS OF UTILIZING AIR DISTRIBUTION NOZZLES

(71) Applicant: The Boeing Company, Chicago, IL (US)

(72) Inventors: Nicholas A. Jones, Lynnwood, WA (US); William C. Haas, Seattle, WA (US); Timothy Douglas Pattee, Tacoma, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/361,116

(22) Filed: Jun. 28, 2021

(65) Prior Publication Data

US 2022/0073208 A1    Mar. 10, 2022

Related U.S. Application Data

(60) Provisional application No. 63/181,084, filed on Apr. 28, 2021, provisional application No. 63/134,724, (Continued)

(51) Int. Cl.
*B64D 13/06*    (2006.01)

(52) U.S. Cl.
CPC ...... *B64D 13/06* (2013.01); *B64D 2013/0603* (2013.01)

(58) Field of Classification Search
CPC ........... B64D 13/06; B64D 2013/0603; B64D 2013/003; B05B 7/025; B05B 1/005; F24F 2221/28; F26B 13/104
See application file for complete search history.

(56) References Cited

U.S. PATENT DOCUMENTS 2,820,406 A    1/1958   Argentieri
3,058,491 A    10/1962  Myhre
(Continued)

FOREIGN PATENT DOCUMENTS

CA       3085629 A1    6/2019
DE       19758275 A1   7/1998
(Continued)

OTHER PUBLICATIONS

Machine-generated English translation of DE 19758275 A1, published on Jul. 23, 1998.
(Continued)

*Primary Examiner* — Edelmira Bosques
*Assistant Examiner* — Brett Peterson Mallon
(74) *Attorney, Agent, or Firm* — Kolitch Romano Dascenzo Gates LLC

(57) ABSTRACT

Air distribution nozzles, aircraft that include air distribution nozzles, and methods of utilizing air distribution nozzles are disclosed herein. The air distribution nozzles include an elongate inlet chamber, an elongate outlet chamber, and an elongate slot that extends between, and fluidly interconnects, the elongate inlet chamber and the elongate outlet chamber. The air distribution nozzles also include a suction inlet chamber that extends from a suction inlet port to the elongate inlet chamber. The suction inlet port opens into the suction inlet chamber. The air distribution nozzles further include a motive fluid inlet port that extends into the elongate inlet chamber. The air distribution nozzles also include a sensor port that extends into the suction inlet chamber. The air distribution nozzles further include an elongate outlet port that extends from the elongate outlet chamber.

20 Claims, 10 Drawing Sheets

Related U.S. Application Data filed on Jan. 7, 2021, provisional application No. 63/076,048, filed on Sep. 9, 2020.

(56) References Cited

U.S. PATENT DOCUMENTS

| | | | |
|---|---|---|---|
| 3,059,564 | A | 10/1962 | Curran et al. |
| 3,687,054 | A | 8/1972 | Boberg |
| 3,768,394 | A | 10/1973 | Powlesland |
| 4,102,357 | A | 7/1978 | Charlton |
| 4,896,588 | A | 1/1990 | Monda et al. |
| 4,971,768 | A | 11/1990 | Ealba et al. |
| 5,133,194 | A | 7/1992 | Army, Jr. et al. |
| 5,209,259 | A | 5/1993 | Dear et al. |
| 5,807,171 | A | 9/1998 | Felsen |
| 5,929,396 | A | 7/1999 | Awad |
| 6,024,639 | A * | 2/2000 | Scherer ............ B64D 13/00 340/584 |
| 6,413,159 | B1 | 7/2002 | Bates, III et al. |
| 6,920,959 | B2 | 7/2005 | Han et al. |
| 7,100,356 | B2 | 9/2006 | Han et al. |
| 7,409,985 | B2 * | 8/2008 | Biasiotto ............ B60H 1/00071 165/204 |
| 7,802,651 | B2 | 9/2010 | Park et al. |
| 8,118,648 | B2 | 2/2012 | Brüggen et al. |
| 8,616,944 | B2 | 12/2013 | Chambo et al. |
| 9,067,678 | B2 | 6/2015 | Edom et al. |
| 9,783,309 | B2 | 10/2017 | Vue et al. |
| 9,889,939 | B2 | 2/2018 | Zhang et al. |
| 10,197,010 | B2 | 2/2019 | Forsyth |
| 10,220,955 | B2 * | 3/2019 | Gregory ............ G01K 7/16 |
| 2007/0157803 | A1 | 7/2007 | McNeil et al. |
| 2009/0239463 | A1 | 9/2009 | Goenka |
| 2010/0154468 | A1 | 6/2010 | Shaska et al. |
| 2012/0118408 | A1 | 5/2012 | Holmgren |
| 2015/0063995 | A1 | 3/2015 | Rivera et al. |
| 2016/0194086 | A1 | 7/2016 | Trudeau |
| 2019/0023426 | A1 * | 1/2019 | Gray ............ B01D 53/62 |

FOREIGN PATENT DOCUMENTS

| | | | |
|---|---|---|---|
| DE | 102007019539 | A1 | 10/2008 |
| EP | 0292033 | A2 | 11/1988 |
| EP | 2851298 | A1 | 3/2015 |
| GB | 893999 | | 4/1962 |
| JP | 62-228831 | | 7/1987 |
| JP | 409122428 | A | 5/1997 |
| JP | 409122428 | A * | 5/1997 |
| JP | 2020099580 | A | 7/2020 |
| RO | 130182 | A2 | 4/2015 |
| WO | WO 96/25329 | A1 | 8/1996 |
| WO | WO 97/04877 | A1 | 2/1997 |
| WO | WO 99/05459 | A2 | 2/1999 |
| WO | WO 2005/030582 | A1 | 4/2005 |
| WO | WO 2007/147259 | A1 | 12/2007 |

OTHER PUBLICATIONS

Machine-generated English translation of DE 102007019539 A1, published on Oct. 30, 2008.

Machine-generated English translation of JP 2020099580 A, published on Jul. 2, 2020.

Machine-generated English translation of JP 62-228831 abstract, published on Jul. 10, 1987.

Machine-generated English translation of RO 130182 A2, published on Apr. 30, 2015.

Low-Swirl Burner, Turbulent Premixed Combustion Research at Berkeley Lab Center for Computational Sciences and Engineering, downloaded from http://ccse.lbl.gov/Research/Combustion/lowSwirl.html on Jul. 14, 2014.

Salikuddin et al., *Acoustic and Laser Doppler Anemometer Results for Confluent and 12-Lobed $E^3$ Mixer Exhaust Systems for Subsonic Jet Noise Reduction*, National Aeronautics and Space Administration Glenn Research Center, NASA/CR-2002-211597, Sep. 2002 (broken into two parts).

Salikuddin et al., *Acoustic and Laser Doppler Anemometer Results for Confluent, 22-Lobed and Unique-Lobed Mixer Exhaust Systems for Subsonic Jet Noise Reduction*, National Aeronautics and Space Administration Glenn Research Center, NASA/CR-2002-211598, Sep. 2002 (broken into two parts).

U.S. Appl. No. 16/897,630, filed Jun. 10, 2020, Schonhoff et al.

Specification and drawings for unpublished U.S. Appl. No. 16/897,630, filed Jun. 10, 2020.

Machine-generated English language translation for JP 409122428 A, May 13, 1997.

European Patent Office, Extended European Search Report for related European patent application EP 22 16 3359, dated Aug. 17, 2022.

* cited by examiner

US 11,958,616 B2

AIR DISTRIBUTION NOZZLES, AIRCRAFT THAT INCLUDE AIR DISTRIBUTION NOZZLES, AND METHODS OF UTILIZING AIR DISTRIBUTION NOZZLES

RELATED APPLICATIONS

This application claims priority to U.S. Provisional Patent Application No. 63/076,048, which was filed on Sep. 9, 2020, to U.S. Provisional Patent Application No. 63/134,724, which was filed on Jan. 7, 2021, and also to U.S. Provisional Patent Application No. 63/181,084, which was filed on Apr. 28, 2021, the complete disclosures of which are hereby incorporated by reference.

FIELD

The present disclosure relates generally to air distribution nozzles, to aircraft that include air distribution nozzles, and/or to methods of utilizing air distribution nozzles.

BACKGROUND

Distribution nozzles may control, direct, and/or regulate a flow of a fluid, such as air, and may be utilized in a variety of applications. As an example, air distribution nozzles may be utilized to form and/or define an air curtain, such as to permit and/or to facilitate different environmental controls on each side of the air curtain. As another example, air distribution nozzles may be utilized to regulate airflow within an aircraft. In a specific example, an air distribution nozzle may be utilized to form and/or to define an air curtain in a cockpit of the aircraft, such as to permit and/or facilitate independent environmental control of a pilot seating area and a co-pilot seating area of the aircraft. Conventional air distribution nozzles are relatively complex, utilize a significant number of separately manufactured and subsequently assembled parts, and/or are relatively expensive. Thus, there exists a need for improved air distribution nozzles, as well as for aircraft that include improved air distribution nozzles and/or improved methods of utilizing improved air distribution nozzles.

SUMMARY

Air distribution nozzles, aircraft that include air distribution nozzles, and methods of utilizing air distribution nozzles are disclosed herein. The air distribution nozzles include an elongate inlet chamber, an elongate outlet chamber, and an elongate slot that extends between, and fluidly interconnects, the elongate inlet chamber and the elongate outlet chamber. The air distribution nozzles also include a suction inlet chamber that extends from a suction inlet port to the elongate inlet chamber. The suction inlet port opens into the suction inlet chamber and is configured to receive a suction inlet fluid flow along a suction inlet flow axis. The air distribution nozzles further include a motive fluid inlet port that extends into the elongate inlet chamber and is configured to receive a motive fluid flow along a motive flow axis. The air distribution nozzles also include a sensor port that extends into the suction inlet chamber. The air distribution nozzles further include an elongate outlet port that extends from the elongate outlet chamber. The elongate outlet port is configured to discharge an outlet fluid flow, which includes both the motive fluid flow and the suction inlet fluid flow, along an outlet flow axis. The outlet flow axis is oriented at an outlet flow skew angle relative to the motive flow axis.

The aircraft include the air distribution nozzle and an air supply conduit configured to provide the motive fluid flow to the motive fluid inlet port. The methods include providing the motive fluid flow to the elongate inlet chamber via the motive fluid inlet port and along a motive flow direction. The methods also include redirecting the motive fluid flow, within the elongate inlet chamber, to generate a slot fluid flow that flows through the elongate slot and into the elongate outlet chamber. The methods further include generating, within the elongate outlet chamber, a pair of counter-rotating vortices within the slot fluid flow. The methods also include discharging the outlet fluid flow from the elongate outlet port and along an outlet flow direction.

DESCRIPTION

Figure 1:
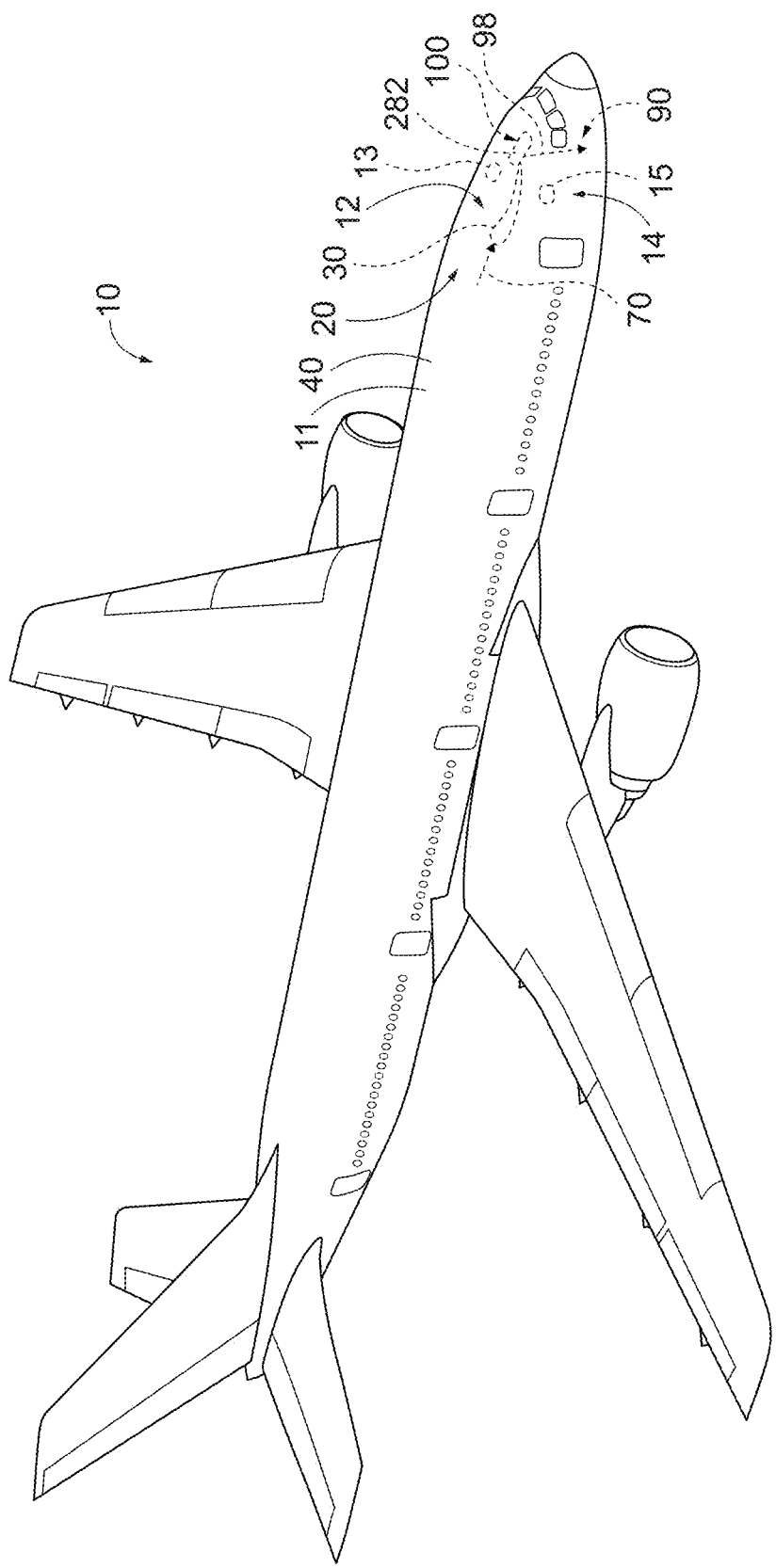
FIG. 1 is a schematic illustration of examples of an aircraft that may include and/or utilize an air distribution nozzle, according to the present disclosure.

FIGS. 1-10 provide illustrative, non-exclusive examples of air distribution nozzles 100, of aircraft 10, and/or of methods according to the present disclosure. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of examples of an aircraft 10 that may include and/or utilize an air distribution nozzle 100, according to the present disclosure. Aircraft 10 also may include an air supply conduit 30, which may be configured to provide a motive fluid flow 70 to air distribution nozzle 100. Air distribution nozzles 100, according to the present disclosure, may be configured to control, to direct, and/or to regulate fluid, or air, flow within, or within an interior 11 of, aircraft 10 in any suitable manner. Examples of air distribution nozzles 100 are disclosed herein.

In some examples, air distribution nozzles 100 may be positioned within a cockpit 20 of aircraft 10. In some such examples, air distribution nozzles 100 may be configured to generate an outlet fluid flow 90 that may function as an air curtain 98. In some such examples, air curtain 98 may flow between a pilot seating area 12 and a co-pilot seating area 14 of aircraft 10, such as to permit, facilitate, and/or enable independent environmental control between the pilot seating area and the co-pilot seating area. Stated another way, air curtain 98 may restrict airflow between pilot seating area 12 and co-pilot seating area 14, thereby permitting independent adjustment of a pilot environmental control 13 and a co-pilot environmental control 15 such that, for example, a pilot temperature within pilot seating area 12 may be maintained different and/or independent from a co-pilot temperature within co-pilot seating area 14.

In some examples, air curtain 98 may decrease a potential for cross-contamination between pilot seating area 12 and co-pilot seating area 14. Stated another way, air curtain 98 may entrain airborne contaminants, such as particulate material, bacteria, and/or viruses, thereby decreasing flow of the airborne contaminants between pilot seating area 12 and co-pilot seating area 14.

Air distribution nozzle 100 may include a sensor 282, which may be configured to detect one or more properties of air proximate and/or within air distribution nozzle 100. In some such examples, aircraft 10 further may include an environmental control system 40, which may be in communication with sensor 282. In some such examples, environmental control system 40 may be configured to control a flow rate of motive fluid flow 70 based, at least in part, on a sensor reading from sensor 282.

Figure 2:
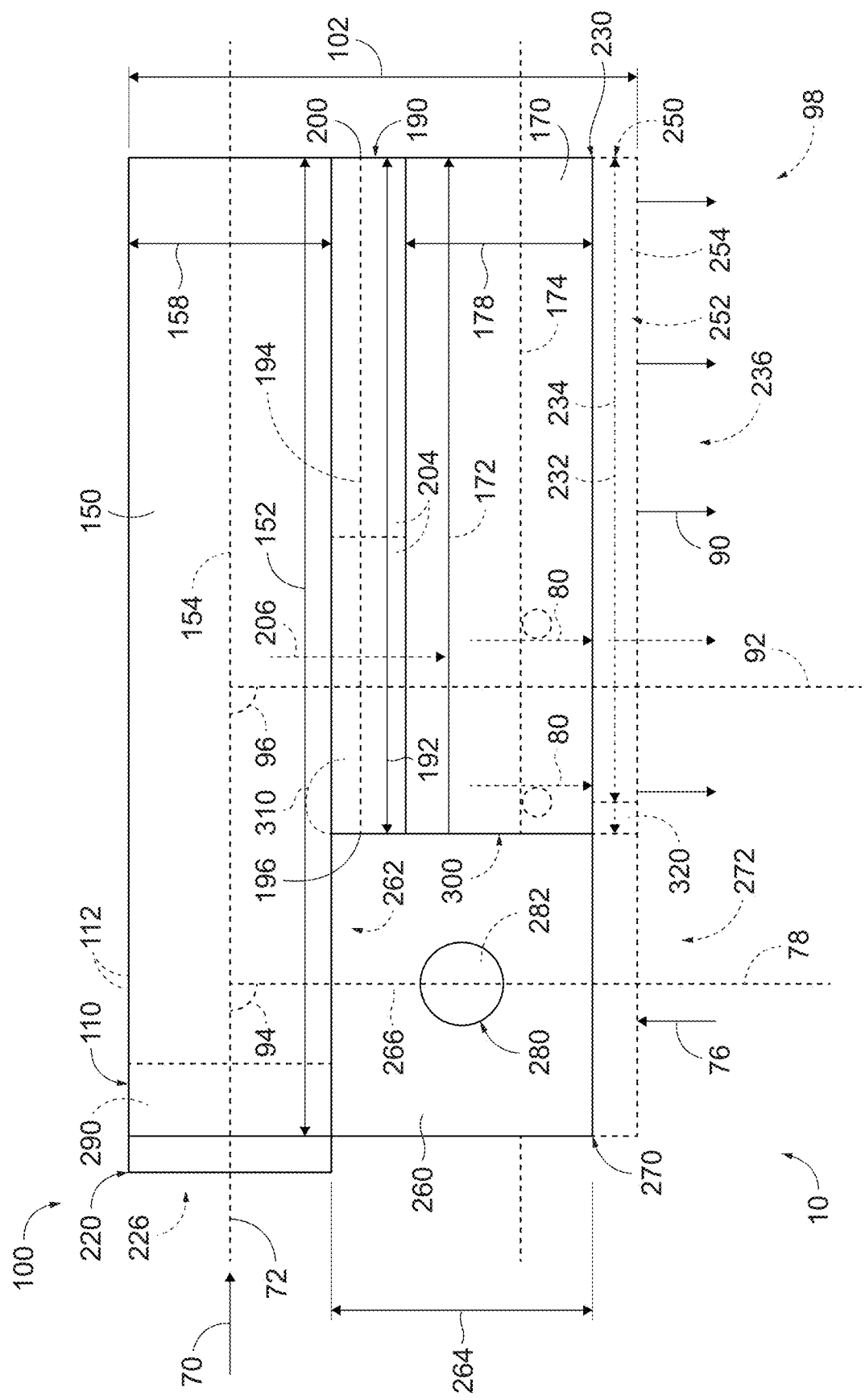
FIG. 2 is a schematic illustration of examples of an air distribution nozzle according to the present disclosure.
Figure 3:
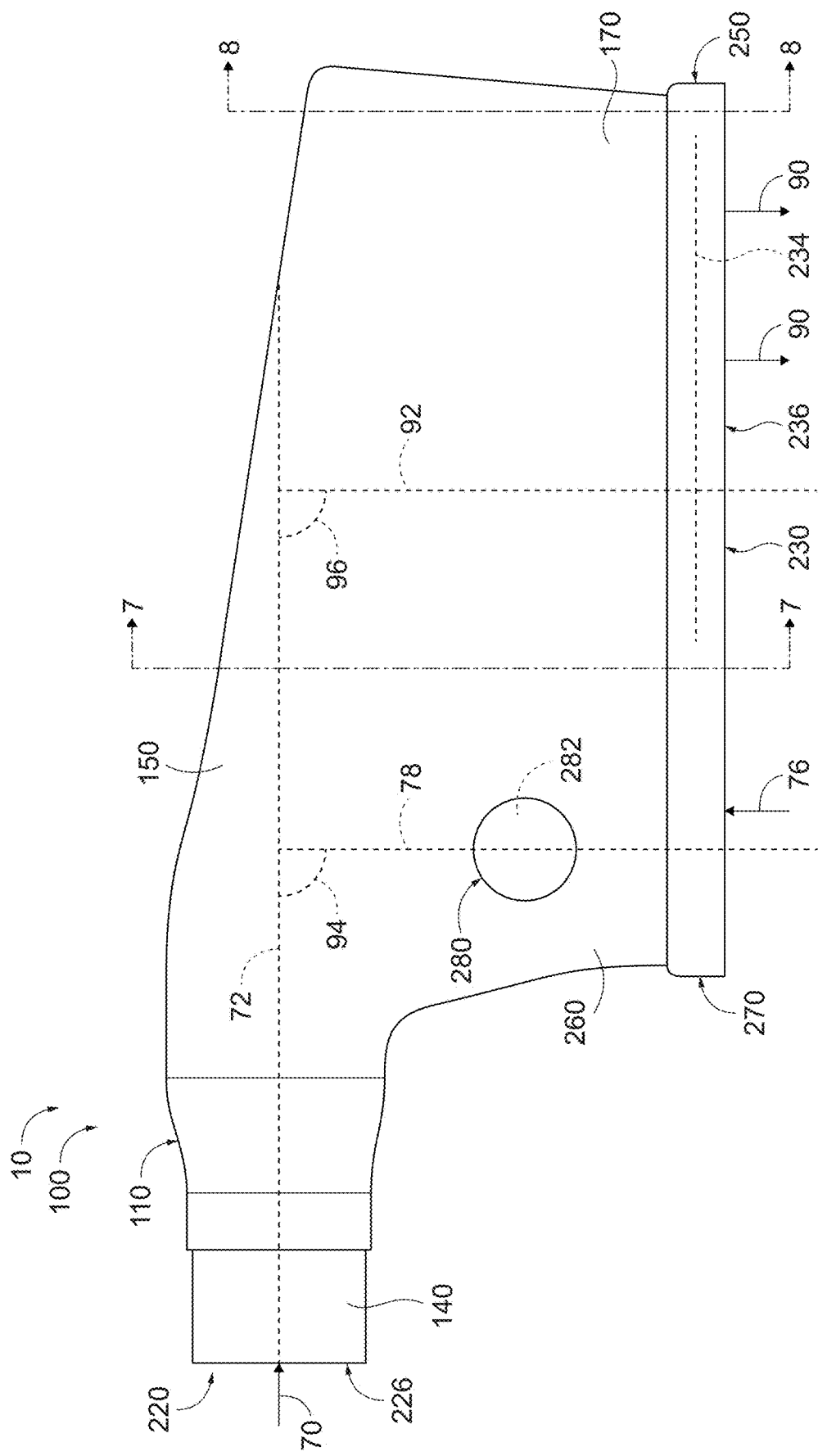
FIG. 3 is a less schematic side view illustrating an example of an air distribution nozzle according to the present disclosure.
Figure 4:
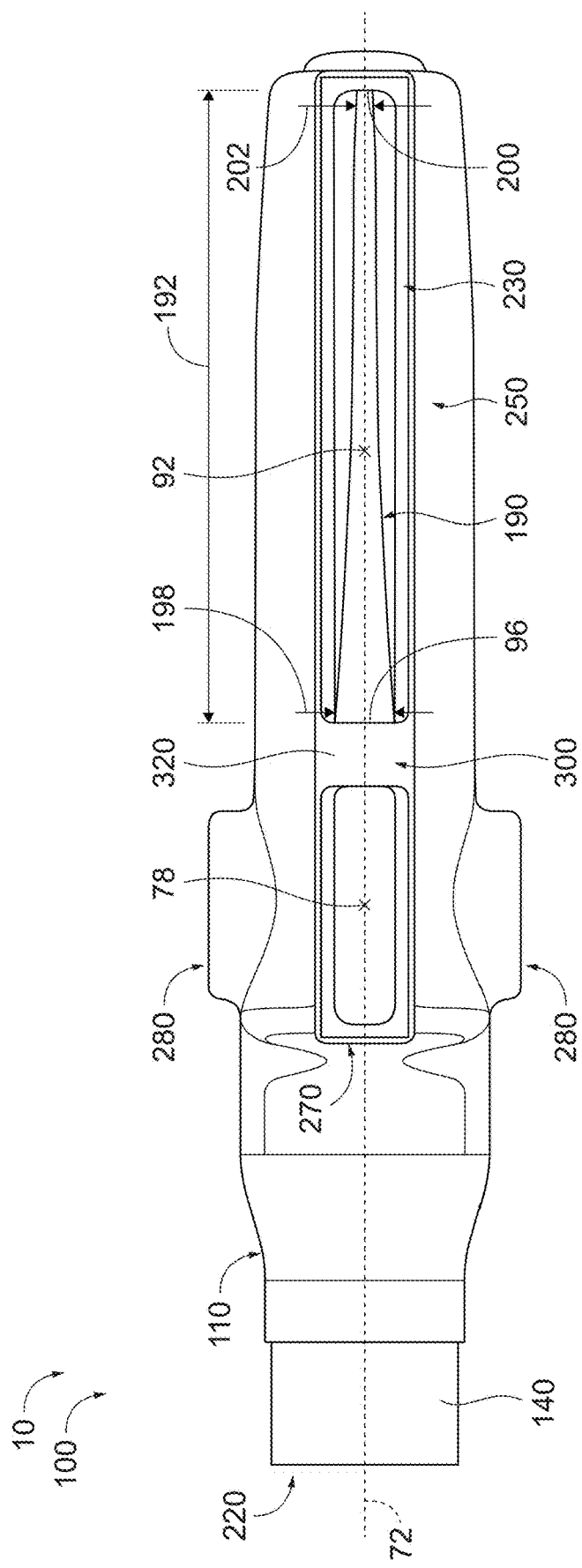
FIG. 4 is a bottom view of the air distribution nozzle of FIG. 3.
Figure 5:
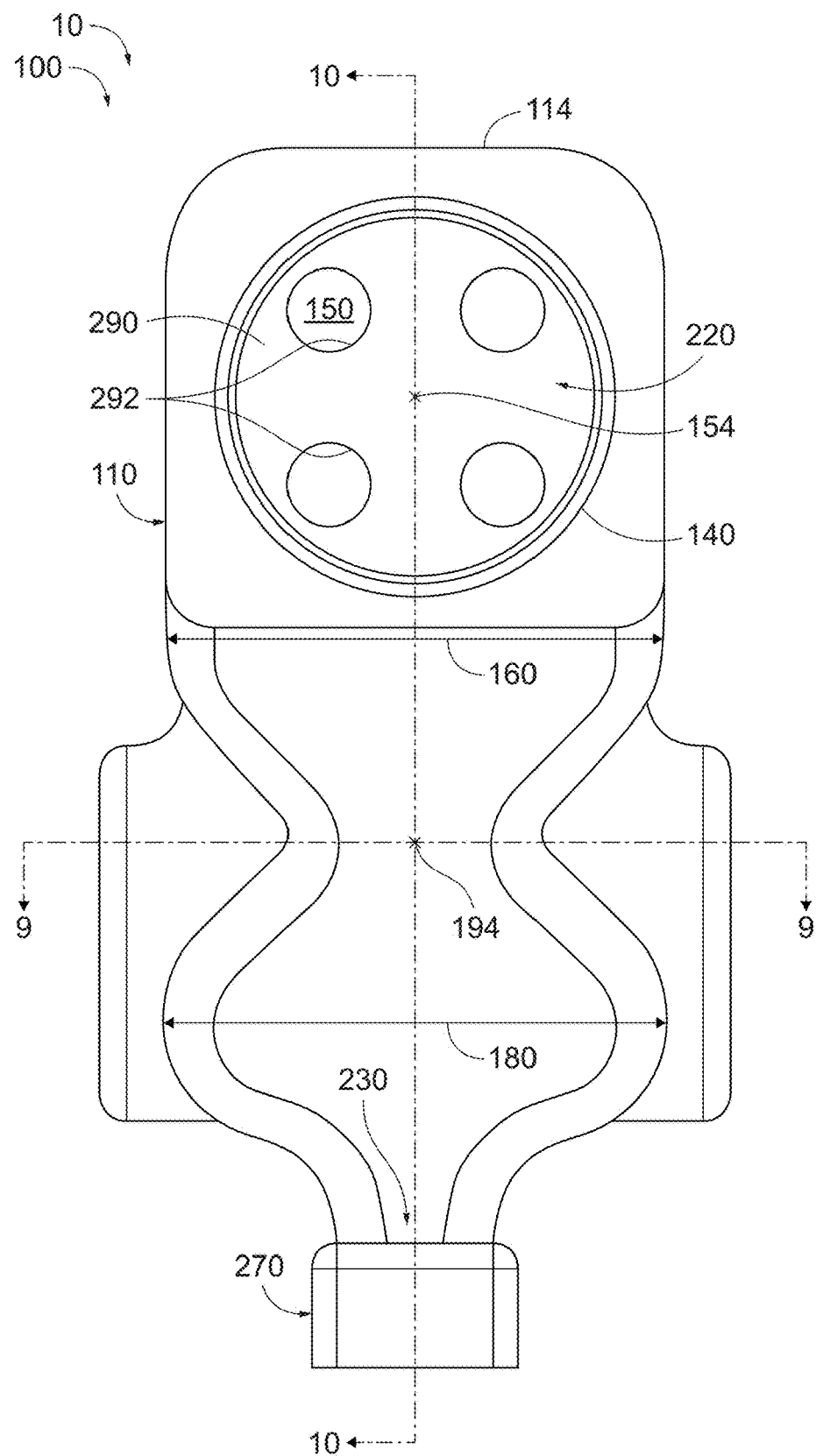
FIG. 5 is a left end view of the air distribution nozzle of FIG. 3.
Figure 6:
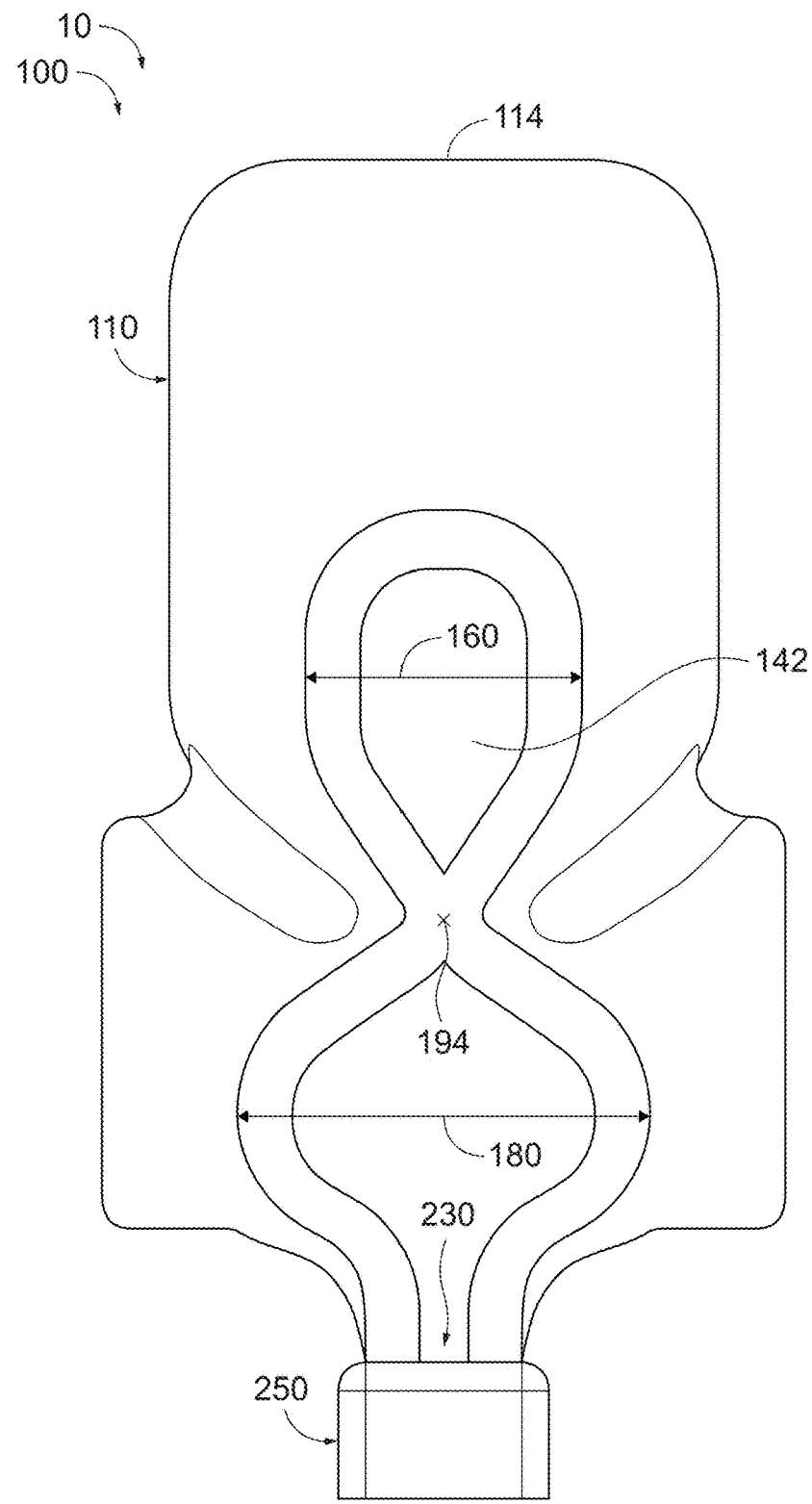
FIG. 6 is a right end view of the air distribution nozzle of FIG. 3.
Figure 7:
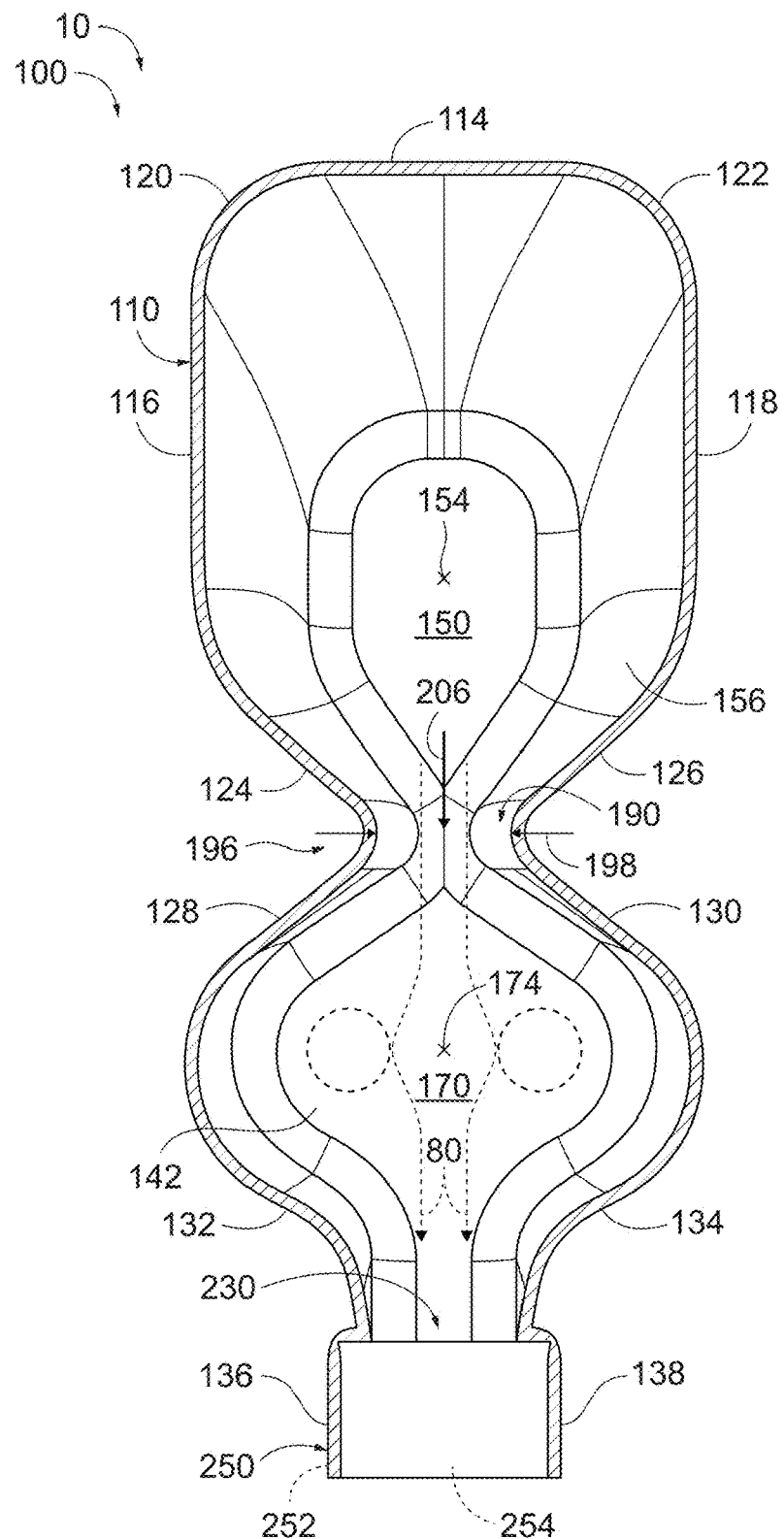
FIG. 7 is a cross-sectional view of the air distribution nozzle of FIG. 3 taken along line 7-7 of FIG. 3.
Figure 8:
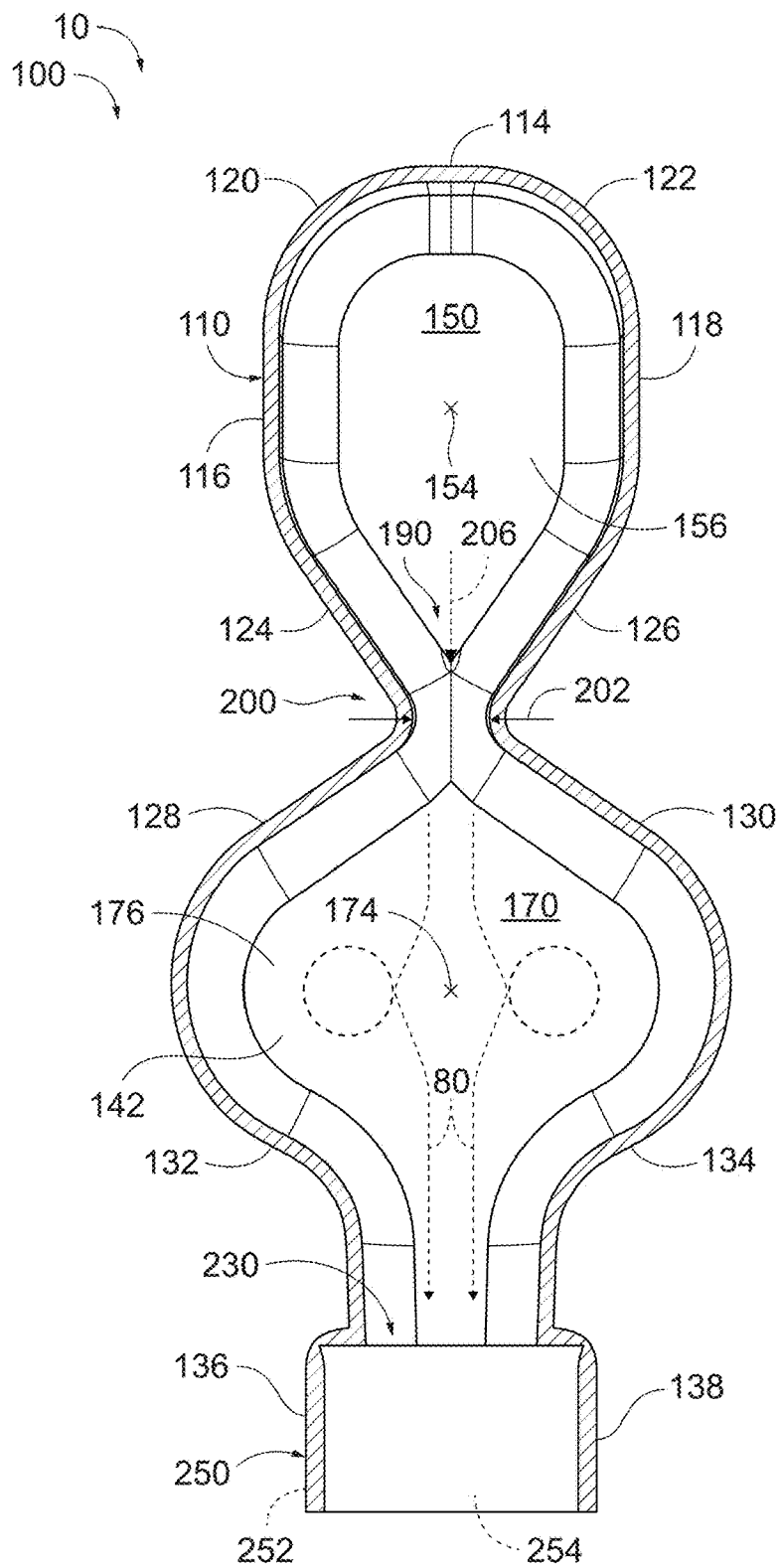
FIG. 8 is a cross-sectional view of the air distribution nozzle of FIG. 3 taken along line 8-8 of FIG. 3.
Figure 9:
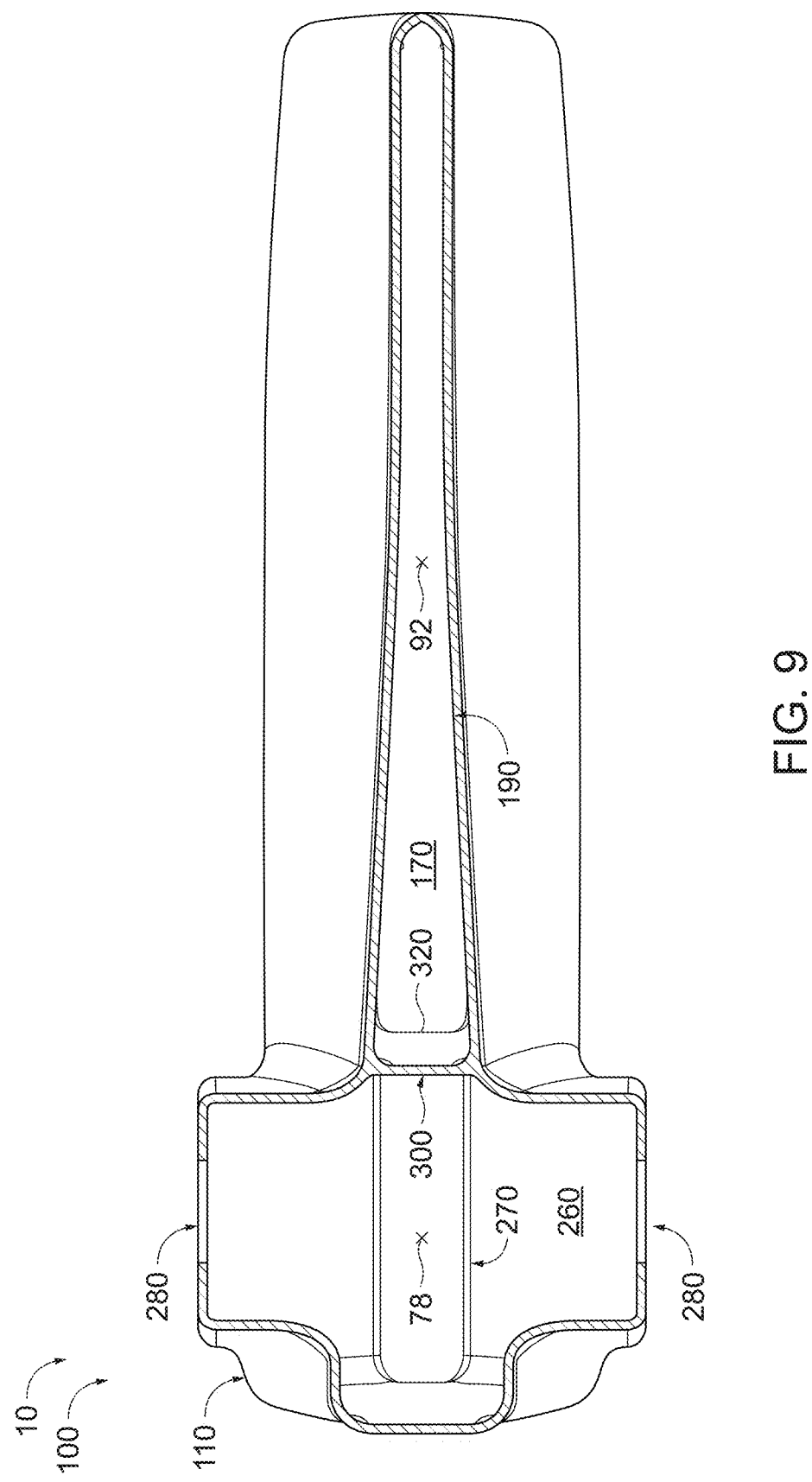
FIG. 9 is a cross-sectional view of the air distribution nozzle of FIG. 3 taken along line 9-9 of FIG. 5.
Figure 10:
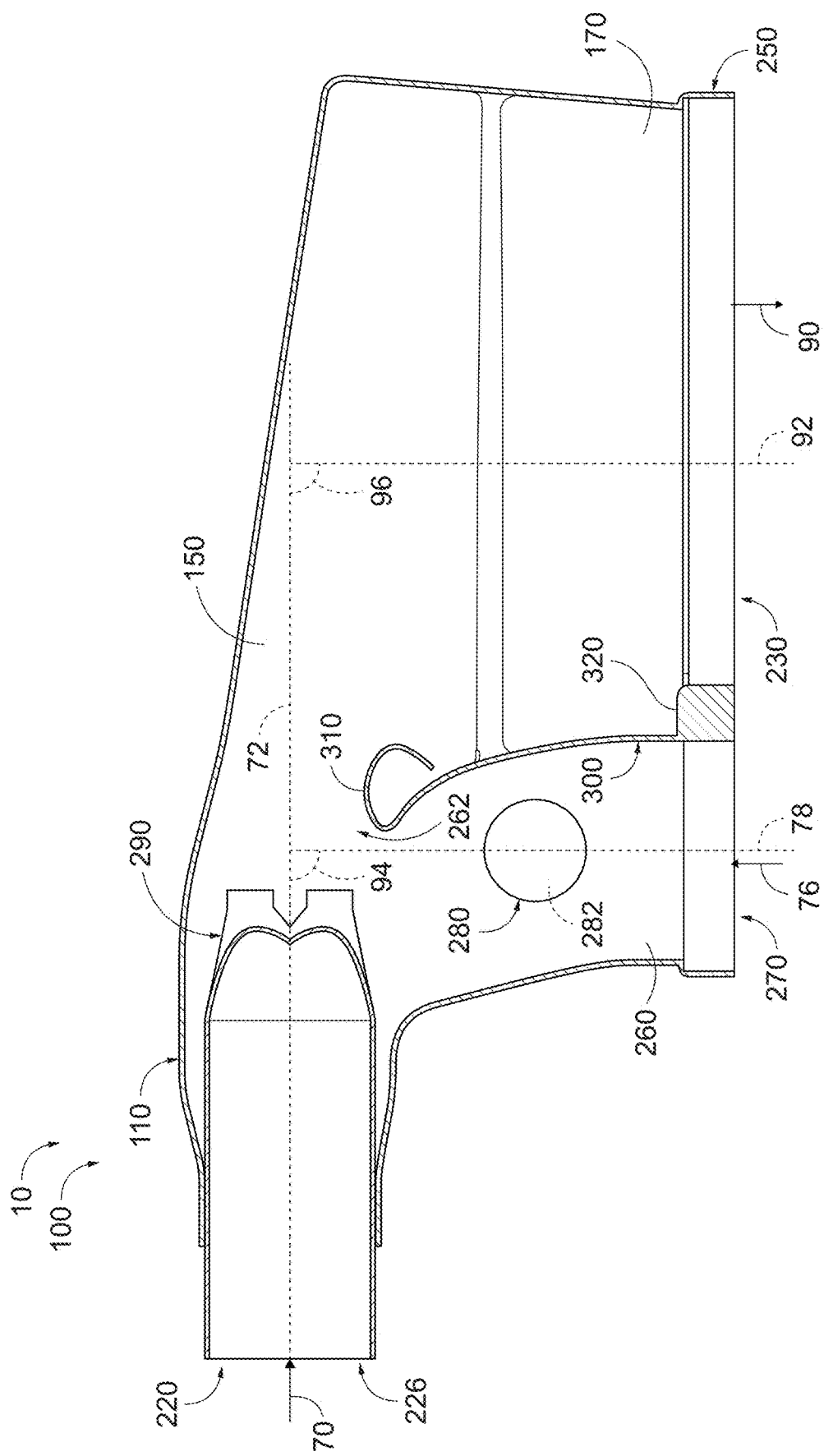
FIG. 10 is a cross-sectional view of the air distribution nozzle of FIG. 3 taken along line 10-10 of FIG. 5.

FIG. 2 is a schematic illustration of examples of an air distribution nozzle 100 according to the present disclosure. FIG. 3 is a less schematic side view illustrating an example of an air distribution nozzle 100 according to the present disclosure, while FIGS. 4-9 provide additional views of air distribution nozzle 100 of FIG. 3. More specifically, FIG. 4 is a bottom view of the air distribution nozzle of FIG. 3, FIG. 5 is a left end view of the air distribution nozzle of FIG. 3, FIG. 6 is a right end view of the air distribution nozzle of FIG. 3, FIG. 7 is a cross-sectional view of the air distribution nozzle of FIG. 3 taken along line 7-7 of FIG. 3, FIG. 8 is a cross-sectional view of the air distribution nozzle of FIG. 3 taken along line 8-8 of FIG. 3, FIG. 9 is a cross-sectional view of the air distribution nozzle of FIG. 3 taken along line 9-9 of FIG. 5, and FIG. 10 is a cross-sectional view of the air distribution nozzle of FIG. 3 taken along line 10-10 of FIG. 5.

Air distribution nozzles 100 of FIGS. 2-10 may include and/or be more detailed illustrations of air distribution nozzles 100 of FIG. 1. With this in mind, any of the structures, functions, and/or features of air distribution nozzles 100 of FIGS. 2-10 may be included in and/or utilized with aircraft 10 of FIG. 1 and/or air distribution nozzles 100 thereof without departing from the scope of the present disclosure. Similarly, any of the structures, functions, and/or features of aircraft 10 of FIG. 1 may be utilized with air distribution nozzles 100 of FIGS. 2-10 without departing from the scope of the present disclosure.

As illustrated in FIG. 2, and collectively by FIGS. 3-10, air distribution nozzles 100 include an elongate inlet chamber 150 and an elongate outlet chamber 170. Elongate inlet chamber 150 extends along an elongate inlet chamber length 152, as illustrated in FIG. 2, and elongate outlet chamber 170 extends, or also extends, at least partially along the elongate inlet chamber length. Air distribution nozzles 100 also include an elongate slot 190, which also may be referred to herein and/or may be a tapered elongate slot 190. Elongate slot 190 extends between, and fluidly interconnects, elongate inlet chamber 150 and elongate outlet chamber 170.

Air distribution nozzles 100 further include a motive fluid inlet port 220, which extends into elongate inlet chamber 150, and an elongate outlet port 230, which extends from elongate outlet chamber 170. Motive fluid inlet port 220 is configured to receive motive fluid flow 70 along a motive flow axis 72 and/or in a motive flow direction (as indicated by the arrow on motive fluid flow 70).

Air distribution nozzles 100 also include a suction inlet chamber 260. Suction inlet chamber 260 extends from a suction inlet port 270 to elongate inlet chamber 150. Suction inlet port 270 opens into suction inlet chamber 260 and is configured to receive a suction inlet fluid flow 76 along a suction inlet flow axis 78. Additionally or alternatively, suction inlet port 270 may be configured to receive suction inlet fluid flow 76 in and/or along a suction inlet flow direction (as indicated by the arrow on suction inlet fluid flow 76), which may be oriented at a suction flow skew angle 94 relative to motive flow axis 72.

Elongate outlet port 230 is configured to discharge outlet fluid flow 90 along an outlet flow axis 92 and/or in an outlet flow direction (as indicated by the arrow on outlet fluid flow 90). Outlet flow axis 92 is oriented at an outlet flow skew angle 96 relative to motive flow axis 72. Stated another way, the motive flow direction may be referred to herein as being at outlet flow skew angle 96 relative to the outlet flow direction. Outlet fluid flow 90 includes both motive fluid flow 70 and suction inlet fluid flow 76.

Air distribution nozzles 100 further include a sensor port 280. Sensor port 280 extends and/or opens into suction inlet chamber 260 and may be configured to receive, to retain, and/or to hold a sensor 282. Sensor 282 may be configured to measure one or more properties of suction inlet fluid flow 76, as discussed in more detail herein.

During operation of air distribution nozzles 100 and/or of aircraft 10 that include air distribution nozzles 100, motive fluid flow 70 may be provided to elongate inlet chamber 150 via motive fluid inlet port 220, in the motive flow direction, and/or along motive flow axis 72. This may include providing motive fluid flow 70 via air supply conduit 30 of FIG. 1. Motive fluid flow 70 may be redirected, within elongate inlet chamber 150 to generate a slot fluid flow 206 that flows through elongate slot 190 and/or into elongate outlet chamber 170. Within elongate outlet chamber 170, a pair of counter-rotating vortices 80 may be generated from and/or within slot fluid flow 206. Outlet fluid flow 90, which may be generated from counter-rotating vortices 80, then may be discharged from elongate outlet port 230 along outlet flow axis 92 and/or in the outlet flow direction.

Generation of counter-rotating vortices 80 may increase a uniformity, may increase a linearity, and/or may increase a laminarity of outlet fluid flow 90. Stated another way, air distribution nozzles 100 may discharge a linear outlet fluid flow 90 and/or a laminar outlet fluid flow 90. Such a configuration may make outlet fluid flow 90 suitable for certain applications, such as air curtain 98, which is discussed in more detail herein.

Supply of motive fluid flow 70 to elongate inlet chamber 150 via motive fluid inlet port 220 also may generate a suction within suction inlet chamber 260, such as via the Venturi effect. Stated another way, air distribution nozzles 100, according to the present disclosure, may function as, may be referred to herein as, and/or may be eductor pumps, venturi pumps, and/or ejector pumps, with motive fluid flow 70 providing a driving force for flow of suction inlet fluid flow 76 into the ejector pumps. The ejector pumps may mix motive fluid flow 70 and suction inlet fluid flow 76 therewithin, such as within elongate inlet chamber 150 and/or within elongate outlet chamber 170, and the combination of motive fluid flow 70 and suction inlet fluid flow 76 may be discharged from the ejector pumps as outlet fluid flow 90.

With the above in mind, air distribution nozzles 100 may be referred to herein as being configured to redirect motive fluid flow 70 from the motive flow direction to the outlet flow direction and also to redirect suction inlet fluid flow 76 from the suction inlet flow direction to the outlet flow direction, such as to produce and/or generate outlet fluid flow 90. This redirection may be such that outlet fluid flow 90 is uniform, or at least substantially uniform, along an outlet port length 232 of elongate outlet port 230, such that the outlet fluid flow is laminar, and/or such that the outlet fluid flow is at least substantially uniformly directed in the outlet flow direction. Additionally or alternatively, this redirection may be such that the outlet flow direction is oriented at the outlet flow skew angle relative to the motive flow direction.

Inclusion of suction inlet port 270, suction inlet chamber 260, and/or sensor port 280 within air distribution nozzles 100, according to the present disclosure, may provide several benefits over conventional air distribution nozzles that do not include suction inlet port 270, suction inlet chamber 260, and/or sensor port 280. As an example, and as discussed, sensor 282, which may be positioned within sensor port 280, may be configured to measure one or more properties of suction inlet fluid flow 76, such as a temperature, a pressure, and/or a moisture content of the suction inlet fluid flow. Environmental control system 40 of FIG. 1 may receive the one or more properties of suction inlet fluid flow 76 and/or may utilize this information to control one or more aspects of an environment within interior 11 of aircraft 10. In a specific example, sensor 282 may measure the temperature of suction inlet fluid flow 76 and a flow rate of motive fluid flow 70 may be controlled, regulated, and/or adjusted based, at least in part, on the temperature of the suction inlet fluid flow. Such a configuration may permit and/or facilitate accurate control of the temperature within interior 11 without a need for additional and/or separate sensors within interior 11.

Motive flow axis 72 may have and/or define any suitable orientation, or relative orientation. As an example, motive flow axis 72 may be perpendicular, or at least substantially perpendicular, to a cross-section, to a transverse cross-section, and/or to a surface that extends across a motive fluid inlet opening 226 of motive fluid inlet port 220. As another example, motive flow axis 72 may be parallel, or at least substantially parallel, to an elongate inlet chamber longitudinal axis 154 of elongate inlet chamber 150, as illustrated in FIG. 2.

Outlet flow axis 92 may have and/or define any suitable orientation, or relative orientation. As an example, outlet flow axis 92 may be perpendicular, or at least substantially perpendicular, to a cross-section, to a transverse cross-section, and/or to a surface that extends across an outlet opening 236 of elongate outlet port 230. As another example, outlet flow axis 92 may be perpendicular, or at least substantially perpendicular, to an outlet port longitudinal axis 234 of elongate outlet port 230.

Suction inlet flow axis 78 may have and/or define any suitable orientation, or relative orientation. As an example, suction inlet flow axis 78 may be perpendicular, or at least substantially perpendicular, to suction inlet port 270 and/or to a cross-section, to a transverse cross-section, and/or to a surface that extends across a suction inlet opening 272 of suction inlet port 270. As another example, suction inlet flow axis 78 may be parallel, or at least substantially parallel, to a suction inlet chamber longitudinal axis 266 of suction inlet chamber 260.

Suction flow skew angle 94 and/or outlet flow skew angle 96, which collectively may be referred to herein as angles $94/96$ may include and/or be any suitable angle between motive flow axis 72 and suction inlet flow axis 78 and/or outlet flow axis 92, respectively. As examples, angles 94/96 may be at least 45 degrees, at least 50 degrees, at least 55 degrees, at least 60 degrees, at least 65 degrees, at least 70 degrees, at least 75 degrees, at least 80 degrees, at least 85 degrees, at least 90 degrees, at most 135 degrees, at most 130 degrees, at most 125 degrees, at most 120 degrees, at most 115 degrees, at most 110 degrees, at most 105 degrees, at most 100 degrees, at most 95 degrees, and/or at most 90 degrees. In a specific example, angles 94/96 may be equal, or at least substantially equal, to 90 degrees.

In another specific example, suction inlet flow axis 78 and outlet flow axis 92 may be parallel, or at least substantially parallel, to one another. Additionally or alternatively, suction flow skew angle 94 may be within a threshold angle difference of outlet flow skew angle 96. Examples of the threshold angle difference include angle differences of at least 1 degree, at least 2.5 degrees, at least 5 degrees, at least 10 degrees, at least 15 degrees, at most 30 degrees, at most 25 degrees, at most 20 degrees, at most 15 degrees, at most 10 degrees, and/or at most 5 degrees.

Motive fluid inlet port 220 may have and/or define any suitable shape, configuration, and/or conformation. As an example, motive fluid inlet port 220 may include and/or be a circular, an at least partially circular, and/or an at least substantially circular motive fluid inlet port 220. As another example, motive fluid inlet port 220 may be shaped, sized, and/or oriented to direct motive fluid flow 70 along, or at least substantially along, elongate inlet chamber longitudinal axis 154. As yet another example, a cross-section of motive fluid inlet port 220, a transverse cross-section of motive fluid inlet port 220, and/or motive fluid inlet opening 226 may be perpendicular, or at least substantially perpendicular, to elongate inlet chamber longitudinal axis 154. Such a configuration may increase a uniformity of motive fluid flow 70 into and/or within elongate inlet chamber 150.

In some examples, and as illustrated in dashed lines in FIG. 2 and in solid lines in FIGS. 5 and 10, air distribution nozzles 100 and/or motive fluid inlet ports 220 thereof may include and/or may be associated with a motive fluid acceleration structure 290. Motive fluid acceleration structure 290, when present, may be adapted, configured, sized, and/or shaped to accelerate, or increase a velocity of, motive fluid flow 70 as the motive fluid flow exits motive fluid inlet port 220 and/or enters elongate inlet chamber 150. Examples of motive fluid acceleration structure 290 include a region of reduced cross-sectional area, an at least partially tapered region, a venturi, an orifice, and/or a plurality of orifices. In a specific example, and as illustrated in FIG. 5, motive fluid acceleration structure 290 includes a venturi with four orifices 292. In some examples, motive fluid acceleration structure 290 may be configured to accelerate motive fluid flow 70 to, or an amount sufficient to, provide a target, or a desired, suction inlet flow rate for suction inlet fluid flow 76.

Elongate outlet port 230 may have and/or define any suitable shape, configuration, and/or conformation. As examples, elongate outlet port 230 may include and/or be a rectangular elongate outlet port 230, an at least substantially rectangular elongate outlet port 230, and/or a rectangular elongate outlet port 230 with rounded corners. In some examples, outlet port longitudinal axis 234 may extend parallel, or at least substantially parallel, to an outlet chamber longitudinal axis 174 of elongate outlet chamber 170.

As discussed, elongate slot 190 may be tapered. Such a configuration may increase a uniformity of flow, or of a flow rate, of slot fluid flow 206, such as by increasing the uniformity of the flow through the elongate slot and/or along a slot length 192 of elongate slot 190.

Elongate slot 190 may have and/or define any suitable shape, configuration, and/or conformation that tapers along slot length 192 thereof, that extends between elongate inlet chamber 150 and elongate outlet chamber 170, and/or that fluidly interconnects elongate inlet chamber 150 and elongate outlet chamber 170. In some examples, elongate slot 190 may extend, or may continuously extend, between a first slot end 196 and a second slot end 200. In some examples, and as illustrated in FIG. 2, elongate slot 190 may include a plurality of slot segments 204. In such a configuration, each slot segment of the plurality of slot segments may fluidly interconnect a given region of elongate inlet chamber 150 with a corresponding region of elongate outlet chamber 170.

Elongate slot 190 may taper in any suitable manner. As an example, and as perhaps best illustrated in FIG. 4, elongate slot 190 may define a first slot width 198 at first slot end 196 and a second slot width 202 at second slot end 200. Second slot width 202 may differ from first slot width 198, and both first slot width 198 and second slot width 202 may be measured in a direction that is perpendicular, or at least substantially perpendicular, to an elongate axis, or slot length 192, of elongate slot 190. Additionally or alternatively, first slot width 198 and/or second slot width 202 may be measured in a direction that is perpendicular, or at least substantially perpendicular, to flow of slot fluid flow 206 through elongate slot 190.

In some examples, and as illustrated, first slot end 196 may be relatively proximate to motive fluid inlet port 220 and/or second slot end 200 may be relatively distal from motive fluid inlet port 220. In some examples, first slot width 198 may be greater than second slot width 202. In some examples, elongate slot 190 may taper, taper monotonically, taper linearly, and/or arcuately taper from first slot width 198 to second slot width 202 and/or between first slot width 198 and second slot width 202.

It is within the scope of the present disclosure that first slot width 198 may differ from second slot width 202 by any suitable amount and/or proportion. As examples, a ratio of first slot width 198 to second slot width 202 may be at least 1.1, at least 1.2, at least 1.3, at least 1.4, at least 1.5, at least 1.6, at least 1.7, at least 1.8, at least 1.9, at least 2.0, at most 4.0, at most 3.8, at most 3.6, at most 3.4, at most 3.2, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and/or at most 1.5.

Examples of first slot width 198 include widths of at least 1.5 millimeters (mm), at least 1.6 mm, at least 1.7 mm, at least 1.8 mm, at least 1.9 mm, at least 2 mm, at least 2.1 mm, at least 2.2 mm, at least 2.3 mm, at least 2.4 mm, at most 3 mm, at most 2.9 mm, at most 2.8 mm, at most 2.7 mm, at most 2.6 mm, at most 2.5 mm, at most 2.4 mm, at most 2.3 mm, at most 2.2 mm, at most 2.1 mm, and/or at most 2 mm. Examples of second slot width 202 include widths of at least 0.5 mm, at least 0.6 mm, at least 0.7 mm, at least 0.8 mm, at least 0.9 mm, at least 1 mm, at least 1.1 mm, at least 1.2 mm, at least 1.3 mm, at least 1.4 mm, at most 2 mm, at most 1.9 mm, at most 1.8 mm, at most 1.7 mm, at most 1.6 mm, at most 1.5 mm, at most 1.4 mm, at most 1.3 mm, at most 1.2 mm, at most 1.1 mm, and/or at most 1 mm.

Air distribution nozzles 100 and/or components thereof may have and/or define any suitable dimension and/or dimensions, such as may permit and/or facilitate operation and/or utilizing of the air distribution nozzles in a target installation, such as within aircraft 10 of FIG. 1, and/or in any desired manner. In some examples, air distribution nozzles 100 may be utilized in environments that are relatively space constrained, such as aircraft 10.

In some examples, elongate inlet chamber 150 may have and/or define elongate inlet chamber length 152, as illustrated in FIG. 2. In some examples, elongate inlet chamber length 152 may be measured along elongate inlet chamber longitudinal axis 154 and/or may be a maximum dimension of elongate inlet chamber 150, such as may be measured along the elongate inlet chamber longitudinal axis. Additionally or alternatively, elongate outlet chamber 170 may have and/or define an outlet chamber length 172, as also illustrated in FIG. 2. In some examples, outlet chamber length 172 may be measured along outlet chamber longitudinal axis 174 and/or may be a maximum dimension of elongate outlet chamber 170, such as may be measured along the outlet chamber longitudinal axis.

Elongate inlet chamber length 152 may differ from, or be greater than, outlet chamber length 172. As examples, a ratio of elongate inlet chamber length 152 to outlet chamber length 172 may be at least 1.0, at least 1.1, at least 1.2, at least 1.3, at least 1.4, at least 1.5, at most 2.0, at most 1.9, at most 1.8, at most 1.7, at most 1.6, at most 1.5, at most 1.4, at most 1.3, and/or at most 1.2. Examples of elongate inlet chamber length 152 include lengths of at least 150 mm, at least 175 mm, at least 200 mm, at least 225 mm, at least 250 mm, at least 275 mm, at least 300 mm, at least 325 mm, at least 350 mm, at least 375 mm, at least 400 mm, at least 425 mm, at least 450 mm, at least 475 mm, at least 500 mm, at most 600 mm, at most 575 mm, at most 550 mm, at most 525 mm, at most 500 mm, at most 450 mm, at most 425 mm, at most 400 mm, at most 375 mm, at most 350 mm, at most 325 mm, and/or at most 300 mm.

In some examples, elongate inlet chamber 150 may have and/or define an elongate inlet chamber width, or an average elongate inlet chamber width, 160, as perhaps best illustrated in FIGS. 5-6. In some examples, elongate inlet chamber width 160 may be measured perpendicular, or at least substantially perpendicular, to elongate inlet chamber longitudinal axis 154, to motive flow axis 72, to a slot longitudinal axis 194 of elongate slot 190, and/or to elongate inlet chamber length 152, as perhaps best illustrated in FIG. 2. Additionally or alternatively, elongate outlet chamber 170 may have and/or define an outlet chamber width, or an average outlet chamber width, 180, as also perhaps best illustrated in FIGS. 5-6. In some examples, outlet chamber width 180 may be measured perpendicular, or at least substantially perpendicular, to outlet chamber longitudinal axis 174, to outlet flow axis 92, to slot longitudinal axis 194, and/or to outlet chamber length 172, as perhaps best illustrated in FIG. 2. Additionally or alternatively, outlet chamber width 180 may be measured parallel to elongate inlet chamber width 160. Examples of elongate inlet chamber width 160 and/or of outlet chamber width 180 include widths of at least 20 mm, at least 25 mm, at least 30 mm, at least 35 mm, at least 40 mm, at least 45 mm, at least 50 mm, at most 75 mm, at most 70 mm, at most 65 mm, at most 60 mm, at most 55 mm, at most 50 mm, at most 45 mm, at most 40 mm, and/or at most 35 mm.

Suction inlet chamber 260 may be shaped, sized, positioned, and/or oriented to direct suction inlet fluid flow 76 into elongate inlet chamber 150 such that suction inlet fluid flow 76 combines and/or mixes with motive fluid flow 70 in and/or within elongate inlet chamber 150. As discussed, supply of motive fluid flow 70 to motive fluid inlet port 220 may produce and/or generate suction, or a vacuum, that provides a motive force for flow of suction inlet fluid flow 76 into suction inlet chamber 260 via suction inlet port 270 and/or through the suction inlet chamber.

Suction inlet port 270 may have any suitable position and/or orientation within air distribution nozzles 100. As an example, suction inlet port 270 may face in the same, or in at least substantially the same, direction as elongate outlet port 230. As a more specific example, suction inlet port 270 may be coplanar, at least substantially coplanar, parallel, and/or at least substantially parallel with elongate outlet port 230.

Suction inlet chamber 260 may define, or may extend along, a suction inlet chamber length 264. Suction inlet chamber length 264 may extend parallel, or at least substantially parallel, to suction inlet chamber longitudinal axis 266 and/or to suction inlet flow axis 78. Additionally or alternatively, suction inlet chamber length 264 may extend perpendicular, or at least substantially perpendicular, to elongate inlet chamber length 152 and/or to elongate outlet chamber length 172.

Suction inlet chamber length 264 may have and/or define any suitable dimension, or relative dimension. As an example, suction inlet chamber length 264 may be a first threshold suction inlet chamber length multiple of an inlet chamber height 158 of elongate inlet chamber 150. Examples of the first threshold suction inlet chamber length multiple include multiples of at least 0.5, at least 0.6, at least 0.7, at least 0.8, at least 0.9, at least 1.0, at most 1.5, at most 1.4, at most 1.3, at most 1.2, at most 1.1, at most 1.0, at most 0.9, at most 0.8, and/or at most 0.7. As another example, suction inlet chamber length 264 may be a second threshold suction inlet chamber length multiple of an outlet chamber height 178 of elongate outlet chamber 170. Examples of the second threshold suction inlet chamber length multiple include multiples of at least 0.5, at least 0.6, at least 0.7, at least 0.8, at least 0.9, at least 1.0, at most 1.5, at most 1.4, at most 1.3, at most 1.2, at most 1.1, and/or at most 1.0.

Air distribution nozzles 100 may have and/or define an overall nozzle height, or an average overall nozzle height, 102, as perhaps best illustrated in FIG. 2. In some examples, overall nozzle height 102 may be measured perpendicular, or at least substantially perpendicular, to elongate inlet chamber longitudinal axis 154, to elongate inlet chamber length 152, to outlet chamber longitudinal axis 174, to outlet chamber length 172, to elongate inlet chamber width 160, to outlet chamber width 180, and/or to slot longitudinal axis 194. Additionally or alternatively, overall nozzle height 102 may be measured parallel, or at least substantially parallel, to outlet flow axis 92, to suction inlet chamber longitudinal axis 266, and/or to suction inlet chamber length 264 of suction inlet chamber 260. Examples of overall nozzle height 102 include heights of at least 75 mm, at least 80 mm, at least 85 mm, at least 90 mm, at least 95 mm, at least 100 mm, at least 105 mm, at least 110 mm, at least 115 mm, at least 120 mm, at most 150 mm, at most 145 mm, at most 140 mm, at most 135 mm, at most 130 mm, at most 125 mm, at most 120 mm, at most 115 mm, at most 110 mm, and/or at most 105 mm.

With continued reference to FIG. 2, elongate inlet chamber 150 may have and/or define inlet chamber height 158. Additionally or alternatively, elongate outlet chamber 170 may have and/or define outlet chamber height 178. Inlet chamber height 158 and outlet chamber height 178 each may be a, a different, and/or a corresponding fraction, or percentage, of overall nozzle height 102. Examples of the fraction include at least 10%, at least 15%, at least 20%, at least 25%, at least 30%, at least 35%, at least 40%, at least 45%, at least 50%, at most 75%, at most 60%, at most 55%, at most 50%, at most 45%, at most 40%, at most 35%, at most 30%, and/or at most 25%.

Elongate inlet chamber 150 may include any suitable structure, conformation, and/or configuration that extends along elongate inlet chamber length 152, that may receive motive fluid flow 70 from motive fluid inlet port 220, and/or that may provide slot fluid flow 206 to elongate outlet chamber 170 via elongate slot 190. In some examples, elongate inlet chamber 150 may be shaped to direct motive fluid flow 70 toward and/or into elongate slot 190.

In some examples, and as perhaps best illustrated by FIGS. 7 and 8, a transverse cross-sectional area 156 of elongate inlet chamber 150 may decrease along motive flow axis 72 and/or in the motive flow direction. In some such examples, a maximum transverse cross-sectional area 156 of elongate inlet chamber 150 may be relatively proximate motive fluid inlet port 220, while a minimum transverse cross-sectional area 156 of the elongate inlet chamber may be relatively distal the motive fluid inlet port. In some such examples, transverse cross-sectional area 156 of elongate inlet chamber 150 may decrease, or monotonically decrease, along the motive flow axis and/or in the motive flow direction. In some such examples, maximum transverse cross-sectional area 156 of elongate inlet chamber 150 may be a threshold inlet chamber area multiple of minimum transverse cross-sectional area 156 of the elongate inlet chamber. Examples of the threshold inlet chamber area multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and/or at most 1.5. Such a configuration may increase uniformity of flow, or of the flow rate, of slot fluid flow 206, such as by increasing the uniformity of the flow along slot length 192 of elongate slot 190.

In some examples, inlet chamber height 158, which also may be referred to herein as a height 158 of elongate inlet chamber 150, may decrease, or monotonically decrease, along motive flow axis 72 and/or in the motive flow direction. In some such examples, a maximum value of inlet chamber height 158, which also may be referred to herein as a maximum height of elongate inlet chamber 150, may be at least a threshold inlet chamber height multiple of a minimum value of inlet chamber height 158, which also may be referred to herein as a minimum height of the elongate inlet chamber. Examples of the threshold inlet chamber height multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration also may increase uniformity of flow, or of the flow rate, of slot fluid flow 206, such as by increasing the uniformity of the flow along slot length 192 of elongate slot 190.

In some examples, elongate inlet chamber width 160, which also may be referred to herein as a width 160 of elongate inlet chamber 150, may decrease, or monotonically decrease, along motive flow axis 72 and/or in the motive flow direction. In some such examples, a maximum value of elongate inlet chamber width 160, which also may be referred to herein as a maximum width of elongate inlet chamber 150, may be at least a threshold elongate inlet chamber width multiple of a minimum value of elongate inlet chamber width 160, which also may be referred to herein as a minimum width of the elongate inlet chamber. Examples of the threshold elongate inlet chamber width multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration also may increase uniformity of flow, or of the flow rate, of slot fluid flow 206, such as by increasing the uniformity of the flow along slot length 192 of elongate slot 190.

Elongate outlet chamber 170 may include any suitable structure, conformation, and/or configuration that extends along outlet chamber length 172, that may receive slot fluid flow 206 from elongate slot 190, that may generate counter-rotating vortices 80, and/or that may discharge outlet fluid flow 90, such as via elongate outlet port 230. In some examples, elongate outlet chamber 170 may be shaped to generate counter-rotating vortices 80 and/or to direct slot fluid flow 206 toward elongate outlet port 230 as outlet fluid flow 90.

In some examples, and as perhaps best illustrated by FIGS. 7 and 8, a transverse cross-sectional area 176 of elongate outlet chamber 170 may decrease along motive flow axis 72 and/or in the motive flow direction. In some such examples, a maximum transverse cross-sectional area 176 of elongate outlet chamber 170 may be relatively proximate motive fluid inlet port 220, while a minimum transverse cross-sectional area 176 of the elongate outlet chamber may be relatively distal the motive fluid inlet port. In some such examples, transverse cross-sectional area 176 of elongate outlet chamber 170 may decrease, or monotonically decrease, along the motive flow axis and/or in the motive flow direction. In some such examples, maximum transverse cross-sectional area 176 of elongate outlet chamber 170 may be a threshold outlet chamber area multiple of minimum transverse cross-sectional area 176 of the elongate outlet chamber. Examples of the threshold outlet chamber area multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and/or at most 1.5. Such a configuration may increase uniformity of flow, or of the flow rate, of outlet fluid flow 90, such as by increasing the uniformity of the flow along outlet port longitudinal axis 234 of elongate outlet port 230.

In some examples, outlet chamber height 178, which also may be referred to herein as a height 178 of elongate outlet chamber 170, may decrease, or monotonically decrease, along motive flow axis 72 and/or in the motive flow direction. In some such examples, a maximum value of outlet chamber height 178, which also may be referred to herein as a maximum height of elongate outlet chamber 170, may be at least a threshold outlet chamber height multiple of a minimum value of outlet chamber height 178, which also may be referred to herein as a minimum height of the elongate outlet chamber. Examples of the threshold outlet chamber height multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration may increase uniformity of flow, or of the flow rate, of outlet fluid flow 90, such as by increasing the uniformity of the flow along outlet port longitudinal axis 234 of elongate outlet port 230.

In some examples, outlet chamber width 180, which also may be referred to herein as a width 180 of elongate outlet chamber 170, may decrease, or monotonically decrease, along motive flow axis 72 and/or in the motive flow direction. In some such examples, a maximum value of outlet chamber width 180, which also may be referred to herein as a maximum width of elongate outlet chamber 170, may be at least a threshold outlet chamber width multiple of a minimum value of outlet chamber width 180, which also may be referred to herein as a minimum width of the elongate outlet chamber. Examples of the threshold outlet chamber width multiple include multiples of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5. Such a configuration may increase uniformity of flow, or of the flow rate, of outlet fluid flow 90, such as by increasing the uniformity of the flow along outlet port longitudinal axis 234 of elongate outlet port 230.

As illustrated in dashed lines in FIG. 2 and in solid lines in FIGS. 3-8, air distribution nozzles 100 may include an elongate exit structure 250. Elongate exit structure 250, when present, may be configured to receive outlet fluid flow 90 from elongate outlet chamber 170 and/or to discharge the outlet fluid flow from air distribution nozzles 100.

In some examples, elongate exit structure 250 may define a diffuser mounting structure 252. Diffuser mounting structure 252, when present, may be adapted, configured, shaped, and/or sized to receive an air diffuser 254 and/or to operatively attach the air diffuser to a remainder of air distribution nozzles 100. In some examples, air distribution nozzles 100 further include air diffuser 254, which may be operatively attached to diffuser mounting structure 252. Examples of diffuser mounting structure 252 include a region that is shaped to receive air diffuser 254 and/or any suitable fastener. Examples of air diffuser 254 include a screen, a grill, and/or a louvre. Air diffuser 254, when present, may be configured to diffuse outlet fluid flow 90 and/or to provide a back pressure to elongate outlet chamber 170. Such a configuration may increase a uniformity of flow, or of the flow rate, of outlet fluid flow 90, such as by increasing the uniformity of the flow along outlet port longitudinal axis 234 of elongate outlet port 230.

In some examples, air distribution nozzles 100 may include and/or may be defined by a nozzle body 110. Nozzle body 110, when present, may define elongate inlet chamber 150, elongate outlet chamber 170, elongate slot 190, motive fluid inlet port 220, elongate exit structure 250, suction inlet chamber 260, suction inlet port 270, sensor port 280, and/or motive fluid acceleration structure 290. In some such examples, nozzle body 110 may include and/or be a monolithic, or a unitary, nozzle body 110, such as may be formed and/or defined by an additive manufacturing process. In some examples, and as illustrated in FIG. 2, nozzle body 110 may include and/or be a composite nozzle body 110, which may be defined by at least two, or by only two, body components 112, which may be operatively attached to one another to define the nozzle body. In some examples, body components 112 may be shaped to be mirror, or at least substantially mirror, images of one another.

Nozzle body 110 may define the various components of air distribution nozzles 100 in any suitable manner. As an example, and as perhaps best illustrated in FIGS. 7-8, nozzle body 110 may include an upper region 114, which may define an upper surface of elongate inlet chamber 150. As another example, nozzle body 110 may define a first elongate inlet chamber side region 116, which may define a first side of elongate inlet chamber 150, and/or a second elongate inlet chamber side region 118, which may define a second side of the elongate inlet chamber. As yet another example, nozzle body 110 may define a first elongate inlet chamber transition region 120, which may transition from upper region 114 to first elongate inlet chamber side region 116, and/or a second elongate inlet chamber transition region 122, which may transition from upper region 114 to second elongate inlet chamber side region 118.

As another example, nozzle body 110 may define a first elongate inlet chamber tapered region 124, which may taper from first elongate inlet chamber side region 116 to at least partially define a first side of elongate slot 190, and/or a second elongate inlet chamber tapered region 126, which may taper from second elongate inlet chamber side region 118 to at least partially define a second side of elongate slot 190. As illustrated, first elongate inlet chamber tapered region 124 and second elongate inlet chamber tapered region 126 may taper toward one another.

As yet another example, nozzle body 110 may define a first upper outlet chamber tapered region 128, which may extend from first elongate inlet chamber tapered region 124 and/or may taper away from elongate slot 190, and/or a second upper outlet chamber tapered region 130, which may extend from second elongate inlet chamber tapered region 126 and/or may taper away from the elongate slot. First upper outlet chamber tapered region 128 and second upper outlet chamber tapered region 130 may taper away from one another.

As another example, nozzle body 110 may define a first lower outlet chamber tapered region 132, which may extend from first upper outlet chamber tapered region 128 to define a first side of elongate outlet port 230, and/or a second lower outlet chamber tapered region 134, which may extend from second upper outlet chamber tapered region 130 to define a second side of elongate outlet port 230. First lower outlet chamber tapered region 132 and second lower outlet chamber tapered region 134 may taper toward one another.

As yet another example, nozzle body 110 may define a first exit structure side region 136, which may extend from first lower outlet chamber tapered region 132 to define a first side of elongate exit structure 250. As another example, nozzle body 110 may define a second exit structure side region 138, which may extend from second lower outlet chamber tapered region 134 to define a second side of the elongate exit structure.

As another example, nozzle body 110 may define an inlet region 140, as perhaps best illustrated in FIGS. 3-5. Inlet region 140 may at least partially define motive fluid inlet port 220 and/or may extend from upper region 114, first elongate inlet chamber side region 116, and/or second elongate inlet chamber side region 118.

As yet another example, nozzle body 110 may define an end region 142, as perhaps best illustrated in FIG. 6. End region 142 may define an inlet-distal end of air distribution nozzle 100. Additionally or alternatively, end region 142 may extend from upper region 114, from first elongate inlet chamber side region 116, from second elongate inlet chamber side region 118, from first elongate inlet chamber transition region 120, from second elongate inlet chamber transition region 122, from first elongate inlet chamber tapered region 124, from second elongate inlet chamber tapered region 126, from first upper outlet chamber tapered region 128, from second upper outlet chamber tapered region 130, from first lower outlet chamber tapered region 132, from second lower outlet chamber tapered region 134, from first exit structure side region 136, and/or from second exit structure side region 138.

As illustrated in dashed lines in FIG. 2 and in solid lines in FIGS. 4 and 10, air distribution nozzles 100 may include a separation structure 300. Separation structure 300, when present, may extend between and/or may fluidly isolate elongate outlet chamber 170 and suction inlet chamber 260. In some examples, separation structure 300 may at least partially define, may at least partially bound, and/or may bound a region of elongate outlet chamber 170 and/or of suction inlet chamber 260. In some examples, motive fluid acceleration structure 290 may be shaped and/or positioned to accelerate motive fluid flow 70 prior to flow of motive fluid flow 70 past separation structure 300.

In some examples, and as perhaps best illustrated in FIGS. 2 and 10, separation structure 300 may include an aerodynamically shaped surface 310. Aerodynamically shaped surface 310, when present, may at least partially define a region 262 of suction inlet chamber 260 that opens into elongate inlet chamber 150. Stated another way, aerodynamically shaped surface 310 may at least partially define a transition region, such as region 262, between suction inlet chamber 260 and elongate inlet chamber 150. Aerodynamically shaped surface 310 may be shaped to direct suction inlet fluid flow 76 toward and/or into elongate slot 190 and/or elongate outlet chamber 170, such as via elongate inlet chamber 150. Examples of aerodynamically shaped surface 310 and/or of region 262 include a convex surface and/or a Coanda surface.

In some examples, separation structure 300 may include an outlet fluid flow redirection structure 320, as illustrated in FIGS. 2 and 10. Outlet fluid flow redirection structure 320 may be positioned within elongate outlet port 230 and/or may at least partially define elongate outlet port 230. Outlet fluid flow redirection structure 320 may be shaped, sized, and/or positioned to direct outlet fluid flow 90 away, or at least partially away, from suction inlet fluid flow 76 and/or from suction inlet port 270. Stated another way, outlet fluid flow redirection structure 320 may be configured to decrease a fraction of outlet fluid flow 90 that is discharged from air distribution nozzle 100 via elongate outlet port 230 and subsequently reenters air distribution nozzle 100 via suction inlet port 270 as suction inlet fluid flow 76. An example of outlet fluid flow redirection structure 320 includes a projecting region that projects toward elongate outlet port 230 and/or away from suction inlet port 270.

Air distribution nozzles 100, according to the present disclosure, may be relatively simpler and/or may include fewer components when compared to conventional air distribution nozzles. Such conventional air distribution nozzles often rely upon internal baffles, flow straighteners, and/or flow guides to provide the desired level of fluid flow uniformity, thereby making the conventional air distribution nozzles more expensive and/or complex to manufacture, to install, and/or to maintain. With the above in mind, and in view of the illustrations of air distribution nozzles 100 shown in FIGS. 2-10, it is within the scope of the present disclosure that air distribution nozzles 100, according to the present disclosure, may not include, or may be free from, baffles, flow straighteners, and/or flow guides that may extend and/or project within and/or between elongate inlet chamber 150, elongate outlet chamber 170, elongate slot 190, motive fluid inlet port 220, and/or elongate outlet port 230.

Illustrative, non-exclusive examples of inventive subject matter according to the present disclosure are described in the following enumerated paragraphs:

A1. An air distribution nozzle (100), comprising:
an elongate inlet chamber (150);
an elongate outlet chamber (170);
an elongate slot (190) that extends between, and fluidly interconnects, the elongate inlet chamber (150) and the elongate outlet chamber (170);
a motive fluid inlet port (220) that extends into the elongate inlet chamber (150), wherein the motive fluid inlet port (220) is configured to receive a motive fluid flow (70) along a motive flow axis (72) and optionally in a motive flow direction;
a suction inlet chamber (260) that extends from a suction inlet port (270) to the elongate inlet chamber (150), wherein the suction inlet port (270) opens into the suction inlet chamber (260), wherein the suction inlet port (270) is configured to receive a suction inlet fluid flow (76) along a suction inlet flow axis (78), and optionally in a suction inlet flow direction, that is oriented at a suction flow skew angle (94) relative to the motive flow axis (72);
a sensor port (280) that extends into the suction inlet chamber (260); and
an elongate outlet port (230) that extends from the elongate outlet chamber (170), wherein the elongate outlet port (230) is configured to discharge an outlet fluid flow (90), which includes both the motive fluid flow (70) and the suction inlet fluid flow (76), along an outlet flow axis (92), and optionally in an outlet flow direction, and further wherein the outlet flow axis (92) is oriented at an outlet flow skew angle (96) relative to the motive flow axis (72).

A2. The air distribution nozzle (100) of paragraph A1, wherein the air distribution nozzle (100) further includes a motive fluid acceleration structure (290) configured to increase a velocity of the motive fluid flow (70) as the motive fluid flow (70) enters the elongate inlet chamber (150).

A3. The air distribution nozzle (100) of paragraph A2, wherein the motive fluid acceleration structure (290) includes at least one of:
(i) a region of reduced cross-sectional area;
(ii) an at least partially tapered region;
(iii) an orifice (292); and
(iv) a plurality of orifices (292).

A4. The air distribution nozzle (100) of any of paragraphs A2-A3, wherein the motive fluid acceleration structure (290) is configured to accelerate the motive fluid flow (70) to provide a target suction inlet flow rate for the suction inlet fluid flow (76).

A5. The air distribution nozzle (100) of any of paragraphs A1-A4, wherein the air distribution nozzle (100) further includes a separation structure (300) that extends between, and fluidly isolates, the elongate outlet chamber (170) and the suction inlet chamber (260).

A6. The air distribution nozzle (100) of paragraph A5, wherein the separation structure (300) at least partially defines at least one, and optionally both, of the elongate outlet chamber (170) and the suction inlet chamber (260).

A7. The air distribution nozzle (100) of any of paragraphs A5-A6, wherein the separation structure (300) includes an aerodynamically shaped surface (310) that at least partially defines a region (262) of the suction inlet chamber (260) that opens into the elongate inlet chamber (150).

A8. The air distribution nozzle (100) of paragraph A7, wherein the region (262) of the suction inlet chamber (260) that opens into the elongate inlet chamber (150) includes at least one of a convex surface and a Coanda surface.

A9. The air distribution nozzle (100) of any of paragraphs A5-A8, wherein a/the motive fluid acceleration structure (290) is positioned to accelerate the motive fluid flow (70) prior to flow of the motive fluid flow (70) past the separation structure (300).

A10. The air distribution nozzle (100) of any of paragraphs A5-A9, wherein the separation structure (300) further includes an outlet fluid flow redirection structure (320) shaped to direct the outlet fluid flow (90) away from the suction inlet fluid flow (76).

A11. The air distribution nozzle (100) of paragraph A10, wherein the outlet fluid flow redirection structure (320) is at least one of positioned within the elongate outlet port (230) and at least partially defines the elongate outlet port (230).

A12. The air distribution nozzle (100) of any of paragraphs A1-A11, wherein the air distribution nozzle (100) further includes a sensor (282) positioned within the sensor port (280).

A13. The air distribution nozzle (100) of paragraph A12, wherein the sensor (282) includes, or is, a temperature sensor (282).

A14. The air distribution nozzle (100) of any of paragraphs A1-A13, wherein the suction inlet chamber (260) is shaped to direct the suction inlet fluid flow (76) into the elongate inlet chamber (150) such that the suction inlet fluid flow (76) combines with the motive fluid flow (70) within the elongate inlet chamber (150).

A15. The air distribution nozzle (100) of any of paragraphs A1-A14, wherein supply of the motive fluid flow (70) to the motive fluid inlet port (220) generates a vacuum that provides a motive force for flow of the suction inlet fluid flow (76) into the suction inlet chamber (260) via the suction inlet port (270).

A16. The air distribution nozzle (100) of any of paragraphs A1-A15, wherein the suction inlet port (270) is coplanar with the elongate outlet port (230).

A16.1 The air distribution nozzle (100) of any of paragraphs A1-A16, wherein the suction inlet chamber (260) extends along a suction inlet chamber length (264).

A16.2 The air distribution nozzle (100) of paragraph A16.1, wherein the suction inlet chamber length (264) extends perpendicular, or at least substantially perpendicular, to at least one of:
(i) an elongate inlet chamber length (152) of the elongate inlet chamber (150); and
(ii) an outlet chamber length (172) of the elongate outlet chamber (170).

A16.3 The air distribution nozzle (100) of paragraph A16.2, wherein the suction inlet chamber length (264) is a first threshold suction inlet chamber length multiple of an inlet chamber height (158) of elongate inlet chamber (150), optionally wherein the first threshold suction inlet chamber length multiple is at least one of at least 0.5, at least 0.6, at least 0.7, at least 0.8, at least 0.9, at least 1.0, at most 1.5, at most 1.4, at most 1.3, at most 1.2, at most 1.1, at most 1.0, at most 0.9, at most 0.8, or at most 0.7.

A16.4 The air distribution nozzle (100) of any of paragraphs A16.2-A16.3, wherein the suction inlet chamber length (264) is a second threshold suction inlet chamber length multiple of an outlet chamber height (178) of elongate outlet chamber (170), optionally wherein the second threshold suction inlet chamber length multiple is at least one of at least 0.5, at least 0.6, at least 0.7, at least 0.8, at least 0.9, at least 1.0, at most 1.5, at most 1.4, at most 1.3, at most 1.2, at most 1.1, or at most 1.0.

A17. The air distribution nozzle (100) of any of paragraphs A1-A16.4, wherein the suction inlet flow axis (78) is parallel, or at least substantially parallel, to the outlet flow axis (92).

A18. The air distribution nozzle (100) of any of paragraphs A1-A17, wherein the suction flow skew angle (94) is within a threshold angle difference of the outlet flow skew angle (96).

A19. The air distribution nozzle (100) of paragraph A18, wherein the threshold angle difference is at least one of:
(i) at least 1 degree, at least 2.5 degrees, at least 5 degrees, at least 10 degrees, or at least 15 degrees; and
(ii) at most 30 degrees, at most 25 degrees, at most 20 degrees, at most 15 degrees, at most 10 degrees, or at most 5 degrees.

A20. The air distribution nozzle (100) of any of paragraphs A1-A19, wherein the suction inlet flow axis (78) is perpendicular, or at least substantially perpendicular, to at least one of:
(i) the suction inlet port (270); and
(ii) a transverse cross-section of the suction inlet port (270).

A21. The air distribution nozzle (100) of any of paragraphs A1-A20, wherein the motive flow axis (72) is at least one of:
(i) perpendicular, or at least substantially perpendicular, to a transverse cross-section of the motive fluid inlet port (220); and
(ii) parallel, or at least substantially parallel, to an elongate inlet chamber longitudinal axis (154) of the elongate inlet chamber (150).

A22. The air distribution nozzle (100) of any of paragraphs A1-A21, wherein the outlet flow axis (92) is at least one of:
(i) perpendicular, or at least substantially perpendicular, to a transverse cross-section of the elongate outlet port (230);
(ii) perpendicular, or at least substantially perpendicular, to an outlet port longitudinal axis (234) of the elongate outlet port (230); and
(iii) perpendicular, or at least substantially perpendicular, to an outlet chamber longitudinal axis (174) of the elongate outlet chamber (170).

A23. The air distribution nozzle (100) of any of paragraphs A1-A22, wherein the outlet flow skew angle (96) is at least one of:
(i) at least 45 degrees, at least 50 degrees, at least 55 degrees, at least 60 degrees, at least 65 degrees, at least 70 degrees, at least 75 degrees, at least 80 degrees, at least 85 degrees, or at least 90 degrees;
(ii) at most 135 degrees, at most 130 degrees, at most 125 degrees, at most 120 degrees, at most 115 degrees, at most 110 degrees, at most 105 degrees, at most 100 degrees, at most 95 degrees, or at most 90 degrees; and
(iii) at least substantially equal to 90 degrees.

A24. The air distribution nozzle (100) of any of paragraphs A1-A23, wherein the motive fluid inlet port (220) is a circular, at least partially circular, or at least substantially circular, motive fluid inlet port (220).

A25. The air distribution nozzle (100) of any of paragraphs A1-A24, wherein the motive fluid inlet port (220) is oriented to direct the motive fluid flow (70) along, or at least substantially along, an/the elongate inlet chamber longitudinal axis (154) of the elongate inlet chamber (150).

A26. The air distribution nozzle (100) of any of paragraphs A1-A25, wherein a/the transverse cross-section of the motive fluid inlet port (220) is perpendicular, or at least substantially perpendicular, to a/the elongate inlet chamber longitudinal axis (154) of the elongate inlet chamber (150).

A27. The air distribution nozzle (100) of any of paragraphs A1-A26, wherein the elongate outlet port (230) is at least one of:
(i) a rectangular elongate outlet port (230);
(ii) an at least substantially rectangular elongate outlet port (230); and
(iii) a rectangular elongate outlet port (230) with rounded corners.

A28. The air distribution nozzle (100) of any of paragraphs A1-A27, wherein a/the outlet port longitudinal axis (234) of the elongate outlet port (230) extends parallel, or at least substantially parallel, to an/the outlet chamber longitudinal axis (174) of the elongate outlet chamber (170).

A29. The air distribution nozzle (100) of any of paragraphs A1-A28, wherein the elongate slot (190) continuously extends between a first slot end (196) and a second slot end (200).

A30. The air distribution nozzle (100) of any of paragraphs A1-A29, wherein the elongate slot (190) includes a plurality of slot segments (204), wherein each slot segment (204) of the plurality of slot segments (204) fluidly interconnects a given region of the elongate inlet chamber (150) with a corresponding region of the elongate outlet chamber (170).

A31. The air distribution nozzle (100) of any of paragraphs A1-A30, wherein the elongate slot (190) is a tapered elongate slot (190).

A32. The air distribution nozzle (100) of paragraph A31, wherein the tapered elongate slot (190) defines a first slot width (198) at a/the first slot end (196) of the tapered elongate slot (190) and a second slot width (202), which differs from the first slot width (198), at a/the second slot end (200) of the tapered elongate slot (190).

A33. The air distribution nozzle (100) of paragraph A32, wherein the first slot end (196) of the tapered elongate slot (190) is relatively proximate to the motive fluid inlet port (220) and the second slot end (200) of the tapered elongate slot (190) is relatively distal from the motive fluid inlet port (220).

A34. The air distribution nozzle (100) of any of paragraphs A32-A33, wherein the first slot width (198) is greater than the second slot width (202).

A35. The air distribution nozzle (100) of any of paragraphs A32-A34, wherein the tapered elongate slot (190) at least one of:
(i) tapers monotonically from the first slot width (198) to the second slot width (202);
(ii) tapers linearly from the first slot width (198) to the second slot width (202); and
(iii) arcuately tapers from the first slot width (198) to the second slot width (202).

A36. The air distribution nozzle (100) of any of paragraphs A32-A35, wherein a ratio of the first slot width (198) to the second slot width (202) is at least one of:
(i) at least 1.1, at least 1.2, at least 1.3, at least 1.4, at least 1.5, at least 1.6, at least 1.7, at least 1.8, at least 1.9, or at least 2.0; and
(ii) at most 4.0, at most 3.8, at most 3.6, at most 3.4, at most 3.2, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, or at most 1.5.

A37. The air distribution nozzle (100) of any of paragraphs A32-A36, wherein the first slot width (198) is at least one of:
(i) at least 1.5 millimeters (mm), at least 1.6 mm, at least 1.7 mm, at least 1.8 mm, at least 1.9 mm, at least 2 mm, at least 2.1 mm, at least 2.2 mm, at least 2.3 mm, or at least 2.4 mm; and
(ii) at most 3 mm, at most 2.9 mm, at most 2.8 mm, at most 2.7 mm, at most 2.6 mm, at most 2.5 mm, at most 2.4 mm, at most 2.3 mm, at most 2.2 mm, at most 2.1 mm, or at most 2 mm.

A38. The air distribution nozzle (100) of any of paragraphs A32-A37, wherein the second slot width (202) is at least one of:
(i) at least 0.5 mm, at least 0.6 mm, at least 0.7 mm, at least 0.8 mm, at least 0.9 mm, at least 1 mm, at least 1.1 mm, at least 1.2 mm, at least 1.3 mm, or at least 1.4 mm; and
(ii) at most 2 mm, at most 1.9 mm, at most 1.8 mm, at most 1.7 mm, at most 1.6 mm, at most 1.5 mm, at most 1.4 mm, at most 1.3 mm, at most 1.2 mm, at most 1.1 mm, or at most 1 mm.

A39. The air distribution nozzle (100) of any of paragraphs A1-A38, wherein the elongate inlet chamber (150) extends along an elongate inlet chamber length (152).

A40. The air distribution nozzle (100) of paragraph A39, wherein the elongate outlet chamber (170) extends along the elongate inlet chamber length (152).

A41. The air distribution nozzle (100) of any of paragraphs A39-A40, wherein the elongate inlet chamber (150) defines an/the elongate inlet chamber length (152) and the elongate outlet chamber (170) defines an outlet chamber length (172).

A42. The air distribution nozzle (100) of paragraph A41, wherein at least one of:
(i) the elongate inlet chamber length (152) is measured along an/the elongate inlet chamber longitudinal axis (154); and
(ii) the outlet chamber length (172) is measured along an/the outlet chamber longitudinal axis (174).

A43. The air distribution nozzle (100) of any of paragraphs A41-A42, wherein a ratio of the elongate inlet chamber length (152) to the outlet chamber length (172) is at least one of:
(i) at least 1.0, at least 1.1, at least 1.2, at least 1.3, at least 1.4, or at least 1.5; and
(ii) at most 2.0, at most 1.9, at most 1.8, at most 1.7, at most 1.6, at most 1.5, at most 1.4, at most 1.3, or at most 1.2.

A44. The air distribution nozzle (100) of any of paragraphs A41-A43, wherein the elongate inlet chamber length (152) is at least one of:
(i) at least 150 mm, at least 175 mm, at least 200 mm, at least 225 mm, at least 250 mm, at least 275 mm, at least 300 mm, at least 325 mm, at least 350 mm, at least 375 mm, at least 400 mm, at least 425 mm, at least 450 mm, at least 475 mm, or at least 500 mm; and
(ii) at most 600 mm, at most 575 mm, at most 550 mm, at most 525 mm, at most 500 mm, at most 450 mm, at most 425 mm, at most 400 mm, at most 375 mm, at most 350 mm, at most 325 mm, or at most 300 mm.

A45. The air distribution nozzle (100) of any of paragraphs A1-A44, wherein the elongate inlet chamber (150) defines an elongate inlet chamber width (160), or an average elongate inlet chamber width (160), and the elongate outlet chamber (170) defines an outlet chamber width (180), or an average outlet chamber width (180).

A46. The air distribution nozzle (100) of paragraph A45, wherein at least one of:
(i) the elongate inlet chamber width (160) is measured perpendicular, or at least substantially perpendicular, to an/the elongate inlet chamber longitudinal axis (154);
(ii) the outlet chamber width (180) is measured perpendicular, or at least substantially perpendicular, to an/the outlet chamber longitudinal axis (174);
(iii) the elongate inlet chamber width (160) is measured perpendicular, or at least substantially perpendicular, to the motive flow axis (72);
(iv) the outlet chamber width (180) is measured perpendicular, or at least substantially perpendicular, to the outlet flow axis (92);
(v) the elongate inlet chamber width (160) is measured perpendicular, or at least substantially perpendicular, to a slot longitudinal axis (194) along which the elongate slot (190) extends; and
(vi) the outlet chamber width (180) is measured perpendicular, or at least substantially perpendicular, to the slot longitudinal axis (194).

A47. The air distribution nozzle (100) of any of paragraphs A45-A46, wherein at least one of the elongate inlet chamber width (160), or an average elongate inlet chamber width (160), and the outlet chamber width (180), or an average outlet chamber width (180), is at least one of:
(i) at least 20 mm, at least 25 mm, at least 30 mm, at least 35 mm, at least 40 mm, at least 45 mm, or at least 50 mm; and
(ii) at most 75 mm, at most 70 mm, at most 65 mm, at most 60 mm, at most 55 mm, at most 50 mm, at most 45 mm, at most 40 mm, or at most 35 mm.

A48. The air distribution nozzle (100) of any of paragraphs A1-A47, wherein the air distribution nozzle (100) defines an overall nozzle height (102), or an average overall nozzle height (102).

A49. The air distribution nozzle (100) of paragraph A48, wherein the overall nozzle height (102) is at least one of:
(i) measured perpendicular, or at least substantially perpendicular, to an/the elongate inlet chamber longitudinal axis (154);
(ii) measured perpendicular, or at least substantially perpendicular, to an/the outlet chamber longitudinal axis (174);
(iii) measured parallel, or at least substantially parallel, to the outlet flow axis (92); and
(iv) measured perpendicular, or at least substantially perpendicular, to a/the slot longitudinal axis (194).

A50. The air distribution nozzle (100) of any of paragraphs A48-A49, wherein the overall nozzle height (102) is at least one of:
(i) at least 75 mm, at least 80 mm, at least 85 mm, at least 90 mm, at least 95 mm, at least 100 mm, at least 105 mm, at least 110 mm, at least 115 mm, or at least 120 mm; and
(ii) at most 150 mm, at most 145 mm, at most 140 mm, at most 135 mm, at most 130 mm, at most 125 mm, at most 120 mm, at most 115 mm, at most 110 mm, or at most 105 mm.

A51. The air distribution nozzle (100) of any of paragraphs A1-A50, wherein a transverse cross-sectional area (156) of the elongate inlet chamber (150) decreases along the motive flow direction, optionally wherein a maximum transverse cross-sectional area (156) of the elongate inlet chamber (150) is a threshold elongate inlet chamber area multiple of a minimum transverse cross-sectional area (156) of the elongate inlet chamber (150), and further optionally wherein the threshold elongate inlet chamber area multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A52. The air distribution nozzle (100) of any of paragraphs A1-A51, wherein a height (158) of the elongate inlet chamber (150) decreases along the motive flow direction, optionally where a maximum height (158) of the elongate inlet chamber (150) is a threshold elongate inlet chamber height multiple of a minimum height (158) of the elongate inlet chamber (150), and further optionally wherein the threshold elongate inlet chamber height multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A53. The air distribution nozzle (100) of any of paragraphs A1-A52, wherein a width (160) of the elongate inlet chamber (150) decreases along the motive flow direction, optionally wherein a maximum width (160) of the elongate inlet chamber (150) is at least a threshold elongate inlet chamber width multiple of a minimum width (160) of the elongate inlet chamber (150), and further optionally wherein the threshold elongate inlet chamber width multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A54. The air distribution nozzle (100) of any of paragraphs A1-A53, wherein the elongate inlet chamber (150) is shaped to direct the motive fluid flow (70) toward the elongate slot (190).

A55. The air distribution nozzle (100) of any of paragraphs A1-A54, wherein a transverse cross-sectional area (176) of the elongate outlet chamber (170) decreases along the motive flow direction, optionally wherein a maximum transverse cross-sectional area (176) of the elongate outlet chamber (170) is at least a threshold outlet chamber area multiple of a minimum transverse cross-sectional area (176) of the elongate outlet chamber (170), and further optionally wherein the threshold outlet chamber area multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A56. The air distribution nozzle (100) of any of paragraphs A1-A55, wherein a height (178) of the elongate outlet chamber (170) decreases along the motive flow direction, optionally where a maximum height (178) of the elongate outlet chamber (170) is a threshold outlet chamber height multiple of a minimum height (178) of the elongate outlet chamber (170), and further optionally wherein the threshold outlet chamber height multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A57. The air distribution nozzle (100) of any of paragraphs A1-A56, wherein a width (180) of the elongate outlet chamber (170) decreases along the motive flow direction, optionally wherein a maximum width (180) of the elongate outlet chamber (170) is at least a threshold outlet chamber width multiple of a minimum width (180) of the elongate outlet chamber (170), and further optionally wherein the threshold outlet chamber width multiple is at least one of at least 1.05, at least 1.1, at least 1.15, at least 1.2, at least 1.25, at least 1.3, at least 1.35, at least 1.4, at least 1.5, at least 1.6, at least 1.7, at least 1.8, at least 1.9, at most 3.0, at most 2.9, at most 2.8, at most 2.7, at most 2.6, at most 2.5, at most 2.4, at most 2.3, at most 2.2, at most 2.1, at most 2.0, at most 1.9, at most 1.8, at most 1.7, at most 1.6, and at most 1.5.

A58. The air distribution nozzle (100) of any of paragraphs A1-A57, wherein the elongate inlet chamber (150) is shaped to induce a pair of counter-rotating vortices (80) in fluid flow from the elongate slot (190) to the elongate outlet port (230).

A59. The air distribution nozzle (100) of any of paragraphs A1-A58, wherein the air distribution nozzle (100) further includes an elongate exit structure (250) configured to receive the outlet fluid flow (90) from the elongate outlet port (230).

A60. The air distribution nozzle (100) of paragraph A59, wherein the elongate exit structure (250) defines a diffuser mounting structure (252).

A61. The air distribution nozzle (100) of paragraph A60, wherein the air distribution nozzle (100) further includes an air diffuser (254) operatively attached to the diffuser mounting structure (252), optionally wherein the air diffuser (254) includes at least one of a screen, a grill, and a louvre.

A62. The air distribution nozzle (100) of any of paragraphs A1-A61, wherein the air distribution nozzle (100) includes a nozzle body (110) that defines the elongate inlet chamber (150), the elongate outlet chamber (170), the elongate slot (190), the motive fluid inlet port (220), and the elongate outlet port (230).

A63. The air distribution nozzle (100) of paragraph A62, wherein the nozzle body (110) is a monolithic nozzle body (110).

A64. The air distribution nozzle (100) of any of paragraphs A62-A63, wherein the nozzle body (110) is a composite nozzle body (110) defined by at least two body components (112), and optionally only two body components (112), operatively attached to one another to define the nozzle body (110).

A65. The air distribution nozzle (100) of paragraph A64, wherein the at least two body components (112) are shaped to be mirror, or at least substantially mirror, images of one another.

A66. The air distribution nozzle (100) of any of paragraphs A1-A65, wherein the nozzle body (110) includes at least one of:
(i) an upper region (114), which defines an upper surface of the elongate inlet chamber (150);
(ii) a first elongate inlet chamber side region (116), which defines a first side of the elongate inlet chamber (150);
(iii) a second elongate inlet chamber side region (118), which defines a second side of the elongate inlet chamber (150);
(iv) a first elongate inlet chamber transition region (120) that transitions from the upper region (114) to the first elongate inlet chamber side region (116);
(v) a second elongate inlet chamber transition region (122) that transitions from the upper region (114) to the second elongate inlet chamber side region (118);
(vi) a first elongate inlet chamber tapered region (124), which tapers from the first elongate inlet chamber side region (116) to define a first side of the elongate slot (190);
(vii) a second elongate inlet chamber tapered region (126), which tapers from the second elongate inlet chamber side region (118) to define a second side of the elongate slot (190);
(viii) a first upper outlet chamber tapered region (128), which extends from the first elongate inlet chamber tapered region (124) and tapers away from the elongate slot (190);
(ix) a second upper outlet chamber tapered region (130), which extends from the second elongate inlet chamber tapered region (126) and tapers away from the elongate slot (190);
(x) a first lower outlet chamber tapered region (132), which extends from the first upper outlet chamber tapered region (128) to define a first side of the elongate outlet port (230);
(xi) a second lower outlet chamber tapered region (134), which extends from the second upper outlet chamber tapered region (130) to define a second side of the elongate outlet port (230);
(xii) a first exit structure side region (136), which extends from the first lower outlet chamber tapered region (132) to define a first side of the elongate exit structure (250);
(xiii) a second exit structure side region (138), which extends from the second lower outlet chamber tapered region (134) to define a second side of the elongate exit structure (250);
(xiv) an inlet region (140), which at least partially defines the motive fluid inlet port (220) and extends from at least one of the upper region (114), the first elongate inlet chamber side region (116), and the second elongate inlet chamber side region (118); and
(xv) an end region (142), which defines an inlet-distal end of the air distribution nozzle (100) and extends from at least one of the upper region (114), the first elongate inlet chamber side region (116), the second elongate inlet chamber side region (118), the first elongate inlet chamber transition region (120), the second elongate inlet chamber transition region (122), the first elongate inlet chamber tapered region (124), the second elongate inlet chamber tapered region (126), the first upper outlet chamber tapered region (128), the second upper outlet chamber tapered region (130), the first lower outlet chamber tapered region (132), the second lower outlet chamber tapered region (134), the first exit structure side region (136), and the second exit structure side region (138).

A67. The air distribution nozzle (100) of any of paragraphs A1-A66, wherein the air distribution nozzle (100) is configured to redirect the motive fluid flow (70) from the motive flow direction to the outlet flow direction such that at least one of:
(i) the outlet fluid flow (90) is uniform, or at least substantially uniform, along an outlet port length of the elongate outlet port (230);
(ii) the outlet fluid flow (90) is laminar; and
(iii) the outlet fluid flow (90) is at least substantially uniformly directed in the outlet flow direction.

A68. The air distribution nozzle (100) of any of paragraphs A1-A67, wherein at least one of the elongate inlet chamber (150), the elongate outlet chamber (170), the elongate slot (190), the motive fluid inlet port (220), and the elongate outlet port (230) is free of at least one of:
(i) a baffle;
(ii) a flow straightener; and
(iii) a flow guide.

A69. The air distribution nozzle (100) of any of paragraphs A1-A68, wherein the outlet fluid flow (90) is configured to generate an air curtain (98).

B1. An aircraft (10) comprising:
the air distribution nozzle (100) of any of paragraphs A1-A69; and
an air supply conduit (30) configured to provide the motive fluid flow (70) to the motive fluid inlet port (220).

B2. The aircraft (10) of paragraph B1, wherein the air distribution nozzle (100) is positioned within a cockpit (20) of the aircraft (10), and further wherein the outlet fluid flow (90) is configured to generate the air curtain (98) between a pilot seating area (12) of the aircraft (10) and a co-pilot seating area (14) of the aircraft.

B3. The aircraft (10) of any of paragraphs B1-B2, wherein the aircraft (10) further includes an environmental control system (40) in communication with a/the sensor (282).

B4. The aircraft (10) of paragraph B3, wherein the environmental control system (40) is configured to control a flow rate of the motive fluid flow (70) based, at least in part, on a sensor reading from the sensor (282).

C1. A method of utilizing the air distribution nozzle (100) of any of paragraphs A1-A69 or the aircraft (10) of any of paragraphs B1-B4, the method comprising:
providing the motive fluid flow (70) to the elongate inlet chamber (150) via the motive fluid inlet port (220) and along the motive flow direction;
redirecting, within the elongate inlet chamber (150), the motive fluid flow (70) to generate a slot fluid flow (206) that flows through the elongate slot (190) and into the elongate outlet chamber (170);
generating, within the elongate outlet chamber (170), the pair of counter-rotating vortices (80) within the slot fluid flow (206); and
discharging, from the elongate outlet port (230), the outlet fluid flow (90) along the outlet flow direction.

C2. The method of paragraph C1, wherein the discharging includes discharging such that the outlet flow direction is oriented at the outlet flow skew angle (96) relative to the motive flow direction.

C3. The method of any of paragraphs C1-C2, wherein the discharging includes at least one of:
(i) discharging a linear outlet fluid flow (90); and
(ii) discharging a laminar outlet fluid flow (90).

C4. The method of any of paragraphs C1-C3, wherein, responsive to the providing the motive fluid flow (70), the method further includes generating a suction that draws the suction inlet fluid flow (76) into the suction inlet chamber (260) via the suction inlet port (270).

C5. The method of any of paragraphs C1-C4, wherein the method further includes mixing the motive fluid flow (70) with the suction inlet fluid flow (76) within the elongate inlet chamber (150).

C6. The method of any of paragraphs C1-C4, wherein the method further includes measuring a temperature of the suction inlet fluid flow (76).

C7. The method of paragraph C6, wherein the method further includes selectively regulating a flow rate of the motive fluid flow (70) based, at least in part, on the temperature of the suction inlet fluid flow (76).

D1. The use of an air distribution nozzle (100) to receive a motive fluid flow (70) in a motive inlet direction, to redirect the motive fluid flow (70) to an outlet flow direction that is oriented at an outlet flow skew angle (96) relative to the motive flow direction, and to generate an outlet fluid flow (90) that defines an air curtain (98).

D2. The use of an air distribution nozzle (100) to both detect a temperature of air within an interior (11) of an aircraft (10) and provide an outlet fluid flow (90) to the interior (11) of the aircraft (10).

D3. The use of any of the air distribution nozzles (100) of any of paragraphs A1-A69 or the aircraft of any of paragraphs B1-B4 with any of the methods of any of paragraphs C1-C7.

D4. The use of any of the methods of any of paragraphs C1-C7 with any of the air distribution nozzles (100) of any of paragraphs A1-A69 or any of the aircraft (10) of any of paragraphs B1-B4.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. An air distribution nozzle, comprising:
an elongate inlet chamber;
an elongate outlet chamber;
an elongate slot that extends between, and fluidly interconnects, the elongate inlet chamber and the elongate outlet chamber;
a motive fluid inlet port that extends into the elongate inlet chamber, wherein the motive fluid inlet port is configured to receive a motive fluid flow along a motive flow axis;
a suction inlet chamber that extends from a suction inlet port to the elongate inlet chamber, wherein the suction inlet port opens into the suction inlet chamber, wherein the suction inlet port is configured to receive a suction inlet fluid flow along a suction inlet flow axis, wherein the suction inlet flow axis extends into the elongate inlet chamber such that the suction inlet chamber is configured to discharge the suction inlet fluid flow into the elongate inlet chamber;
a sensor port that extends into the suction inlet chamber; and
an elongate outlet port that extends from the elongate outlet chamber, wherein the elongate outlet port is configured to discharge an outlet fluid flow, which includes both the motive fluid flow and the suction inlet fluid flow, along an outlet flow axis, wherein the outlet flow axis is oriented at an outlet flow skew angle relative to the motive flow axis, and further wherein the suction inlet port is coplanar with the elongate outlet port.

2. The air distribution nozzle of claim 1, wherein the air distribution nozzle further includes a motive fluid acceleration structure configured to increase a velocity of the motive fluid flow as the motive fluid flow enters the elongate inlet chamber.

3. The air distribution nozzle of claim 2, wherein the motive fluid acceleration structure includes at least one of:
(i) a region of reduced cross-sectional area;
(ii) an at least partially tapered region;
(iii) an orifice; and
(iv) a plurality of orifices.

4. The air distribution nozzle of claim 1, wherein the air distribution nozzle further includes a separation structure that extends between, and fluidly isolates, the elongate outlet chamber and the suction inlet chamber.

5. The air distribution nozzle of claim 4, wherein the separation structure at least partially defines at least one of the elongate outlet chamber and the suction inlet chamber.

6. The air distribution nozzle of claim 4, wherein the separation structure includes an aerodynamically shaped surface that at least partially defines a region of the suction inlet chamber that opens into the elongate inlet chamber.

7. The air distribution nozzle of claim 6, wherein the region of the suction inlet chamber that opens into the elongate inlet chamber includes at least one of a convex surface and a Coanda surface.

8. The air distribution nozzle of claim 4, wherein the separation structure further includes an outlet fluid flow redirection structure shaped to direct the outlet fluid flow away from the suction inlet fluid flow.

9. The air distribution nozzle of claim 8, wherein the outlet fluid flow redirection structure is at least one of positioned within the elongate outlet port and at least partially defines the elongate outlet port.

10. The air distribution nozzle of claim 1, wherein the air distribution nozzle further includes a sensor positioned within the sensor port.

11. The air distribution nozzle of claim 1, wherein the suction inlet chamber is shaped to direct the suction inlet fluid flow into the elongate inlet chamber such that the suction inlet fluid flow combines with the motive fluid flow within the elongate inlet chamber.

12. The air distribution nozzle of claim 1, wherein the suction inlet flow axis is at least substantially parallel to the outlet flow axis.

13. An aircraft comprising:
the air distribution nozzle of claim 1; and
an air supply conduit configured to provide the motive fluid flow to the motive fluid inlet port.

14. The aircraft of claim 13, wherein the aircraft further includes an environmental control system in communication with a sensor, wherein the environmental control system is configured to control a flow rate of the motive fluid flow based, at least in part, on a sensor reading from the sensor.

15. A method of utilizing the air distribution nozzle of claim 1, the method comprising:
providing the motive fluid flow to the elongate inlet chamber via the motive fluid inlet port and along a motive flow direction;
redirecting, within the elongate inlet chamber, the motive fluid flow to generate a slot fluid flow that flows through the elongate slot and into the elongate outlet chamber;
generating, within the elongate outlet chamber, a pair of counter-rotating vortices within the slot fluid flow; and
discharging, from the elongate outlet port, the outlet fluid flow along an outlet flow direction.

16. The method of claim 15, wherein, responsive to the providing the motive fluid flow, the method further includes generating a suction that draws the suction inlet fluid flow into the suction inlet chamber via the suction inlet port.

17. The method of claim 16, wherein the method further includes mixing the motive fluid flow with the suction inlet fluid flow within the elongate inlet chamber.

18. An air distribution nozzle, comprising:
an elongate inlet chamber;
an elongate outlet chamber;
an elongate slot that extends between, and fluidly interconnects, the elongate inlet chamber and the elongate outlet chamber, wherein the elongate slot is a tapered elongate slot that tapers along a slot longitudinal axis that extends at least substantially perpendicular to a slot fluid flow that flows from the elongate inlet chamber to the elongate outlet chamber via the elongate slot, wherein the tapered elongate slot defines a first slot width at a first slot end of the tapered elongate slot and a second slot width, which differs from the first slot width, at a second slot end of the tapered elongate slot;
a motive fluid inlet port that extends into the elongate inlet chamber, wherein the motive fluid inlet port is configured to receive a motive fluid flow along a motive flow axis;
a suction inlet chamber that extends from a suction inlet port to the elongate inlet chamber, wherein the suction inlet port opens into the suction inlet chamber, wherein the suction inlet port is configured to receive a suction inlet fluid flow along a suction inlet flow axis;
a sensor port that extends into the suction inlet chamber; and
an elongate outlet port that extends from the elongate outlet chamber, wherein the elongate outlet port is configured to discharge an outlet fluid flow, which includes both the motive fluid flow and the suction inlet fluid flow, along an outlet flow axis, and further wherein the outlet flow axis is oriented at an outlet flow skew angle relative to the motive flow axis.

19. An air distribution nozzle, comprising:
an elongate inlet chamber;
an elongate outlet chamber;
an elongate slot that extends between, and fluidly interconnects, the elongate inlet chamber and the elongate outlet chamber;
a motive fluid inlet port that extends into the elongate inlet chamber, wherein the motive fluid inlet port is configured to receive a motive fluid flow along a motive flow axis;
a suction inlet chamber that extends from a suction inlet port to the elongate inlet chamber, wherein the suction inlet port opens into the suction inlet chamber, wherein the suction inlet port is configured to receive a suction inlet fluid flow along a suction inlet flow axis;
a sensor port that extends into the suction inlet chamber; and
an elongate outlet port that extends from the elongate outlet chamber, wherein the elongate outlet port is configured to discharge an outlet fluid flow, which includes both the motive fluid flow and the suction inlet fluid flow, along an outlet flow axis, wherein the outlet flow axis is oriented at an outlet flow skew angle relative to the motive flow axis, and further wherein the suction inlet port is coplanar with the elongate outlet port; and
wherein the elongate slot extends along a slot longitudinal axis that extends at least substantially perpendicular to a slot fluid flow that flows from the elongate inlet chamber to the elongate outlet chamber via the elongate slot, wherein the elongate slot tapers along the slot longitudinal axis from a first slot width to a second slot width that is less than the first slot width, wherein the first slot width is measured proximate the motive fluid inlet port relative to the second slot width.

20. The air distribution nozzle of claim 19, wherein the suction inlet flow axis extends into the elongate inlet chamber such that the suction inlet chamber is configured to discharge the suction inlet fluid flow into the elongate inlet chamber.

* * * * *